United States Patent
Gaddam et al.

(10) Patent No.: US 11,921,884 B2
(45) Date of Patent: Mar. 5, 2024

(54) TECHNIQUES FOR PREVENTING COLLUSION USING SIMULTANEOUS KEY RELEASE

(71) Applicant: Visa International Service Association, San Francisco, CA (US)

(72) Inventors: Sivanarayana Gaddam, San Francisco, CA (US); Ranjit Kumaresan, San Francisco, CA (US); Rohit Sinha, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 298 days.

(21) Appl. No.: 17/296,510

(22) PCT Filed: May 2, 2019

(86) PCT No.: PCT/US2019/030415
§ 371 (c)(1),
(2) Date: May 24, 2021

(87) PCT Pub. No.: WO2020/112166
PCT Pub. Date: Jun. 4, 2020

(65) Prior Publication Data
US 2022/0012358 A1    Jan. 13, 2022

Related U.S. Application Data

(60) Provisional application No. 62/784,194, filed on Dec. 21, 2018.

(30) Foreign Application Priority Data

Nov. 28, 2018    (WO) ................ PCT/US2018/062847

(51) Int. Cl.
*G06F 21/62*    (2013.01)
*H04L 9/14*    (2006.01)
(Continued)

(52) U.S. Cl.
CPC ............ *G06F 21/6245* (2013.01); *H04L 9/14* (2013.01); *H04L 9/30* (2013.01); *H04L 9/3247* (2013.01); *H04L 9/50* (2022.05)

(58) Field of Classification Search
CPC . H04L 9/0819; H04L 9/14; H04L 9/30; H04L 9/3234; H04L 9/50; H04L 2209/56;
(Continued)

(56) References Cited

U.S. PATENT DOCUMENTS 9,231,925 B1 *  1/2016  Lundström  ............... H04L 9/30
9,577,829 B1 *  2/2017  Roth  ....................... G06F 21/60
(Continued)

FOREIGN PATENT DOCUMENTS

CN    107251476 A    10/2017
CN    108432180 A    8/2018
(Continued)

OTHER PUBLICATIONS

Brandenburger et al., "Blockchain and Trusted Computing: Problems, Pitfalls, and a Solution for Hyperledger Fabric", Available Online at: https://arxiv.org/abs/1805.08541, May 22, 2018, pp. 1-13.
(Continued)

*Primary Examiner* — Eric W Shepperd
(74) *Attorney, Agent, or Firm* — Kilpatrick Townsend & Stockton LLP

(57) ABSTRACT

Described herein are a system and techniques for enabling user control over usage of their information by data consumers, even when untrusted parties are involved, while also preventing collusion between the untrusted party and a data consumer. A user's information may be collected by a client device and provided to a host server. An encrypted version of the user's information may be stored at the host server so that it is processed on a private enclave of the host server.
(Continued)

When the data is to be provided to multiple data consumers, the data may be encrypted for each of the data consumers and may be released to each of those data consumers simultaneously once confirmation has been received that the data has been made available to each of the data consumers.

20 Claims, 9 Drawing Sheets

(51) Int. Cl.
*H04L 9/30* (2006.01)
*H04L 9/32* (2006.01)
*H04L 9/00* (2022.01)

(58) Field of Classification Search
CPC ... H04L 63/10; G06F 21/6218; G06F 21/6245
See application file for complete search history.

(56) References Cited

U.S. PATENT DOCUMENTS

| | | | |
|---|---|---|---|
| 9,614,670 | B1 | 4/2017 | Ghetti et al. |
| 11,349,646 | B1* | 5/2022 | Delaney ............ H04L 63/0478 |
| 2009/0154704 | A1 | 6/2009 | Farrugia et al. |
| 2018/0012032 | A1* | 1/2018 | Radich .................. H04L 9/30 |
| 2018/0150646 | A1 | 5/2018 | Roth et al. |
| 2018/0159833 | A1 | 6/2018 | Zhang et al. |
| 2018/0254898 | A1 | 9/2018 | Sprague et al. |
| 2018/0375644 | A1* | 12/2018 | Karagiannis ........ H04L 63/0281 |
| 2019/0130399 | A1* | 5/2019 | Wright ................ G06Q 40/03 |
| 2019/0334700 | A1* | 10/2019 | Callan ................ H04L 9/0825 |
| 2019/0340170 | A1* | 11/2019 | Pierce .................. G06Q 20/02 |
| 2019/0340361 | A1* | 11/2019 | Daniel ................... G06F 21/57 |
| 2020/0034550 | A1* | 1/2020 | Kim ........................ G06F 21/64 |
| 2020/0134616 | A1* | 4/2020 | Rafalko ............... H04L 9/3239 |

FOREIGN PATENT DOCUMENTS

| | | |
|---|---|---|
| WO | 2018126029 A2 | 7/2018 |
| WO | 2018170504 A1 | 9/2018 |

OTHER PUBLICATIONS

SG11202105237W , "Written Opinion", dated Nov. 15, 2022, 7 pages.
EP19888393.6 , "Extended European Search Report", dated Jul. 19, 2022, 8 pages.
Kaptchuk et al., "Giving State to the Stateless: Augmenting Trustworthy Computation with Ledgers", IACR, International Association For Cryptologic Research, Available online at: http://eprint.iacr.org/2017/201. pdf, Apr. 16, 2018, pp. 1-35.
Choudhuri et al., "Fairness in an Unfair World: Fair Multiparty Computation from Public Bulletin Boards," in Proceedings of the 2017 ACM SIGSAC Conference on Computer and Communications Security, ser. CCS '17. New York, NY, USA: ACM, 2017, pp. 1-35.
PCT/US2018/062847 , "International Search Report and Written Opinion", dated Aug. 19, 2019, 10 pages.
PCT/US2019/030415 , "International Search Report and Written Opinion", dated Aug. 21, 2019, 10 pages.
Application No. SG11202105237W, Notice of Decision to Grant, dated Jun. 7, 2023, 6 pages.
Application No. CN201980077589.6 , Office Action, dated Nov. 30, 2023, with English Translation, 18 pages.

* cited by examiner

TECHNIQUES FOR PREVENTING COLLUSION USING SIMULTANEOUS KEY RELEASE

CROSS-REFERENCE TO RELATED APPLICATIONS

This application is a National Stage of International Application No. PCT/US2018/030415, filed May 2, 2019 which claims priority to U.S. Provisional Application No. 62/784,194, filed on Dec. 21, 2018 and is a continuation-in-part of International Patent Application No. PCT/US2018/062847 filed Nov. 28, 2018, the disclosures of which are herein incorporated by reference in their entirety for all purposes.

BACKGROUND

Modern web services pose a growing public concern regarding their lack of transparency in how they manage sensitive user data. Aside from privacy policies specified in legalese, users have little insight, let alone control, on how their data is used or shared with third parties. It is not surprising that (unbeknownst to the users) their sensitive data is proliferated, misused, and at times lost to attackers in security breaches. While this user data often enables functionality to be provided to a user which would not otherwise be available, those users are often unable to control how that data is used once it leaves the users' possession.

While protocols for controlling use of user data exist, they require users to be online (or trust one or more online third parties to execute the protocol on the user's behalf). Offline users are unable to manually approve each step of a computation, so the system must automatically enforce policies on how inputs are used. This subjects the data to potential attack as automatic enforcement of policies is beyond the capability of trusted execution environments (TEE) alone, due to their inherent inability to protect input and output. For example, an adversarial host software (controlled by a host of a TEE) may rollback the persistent storage across restarts of the TEE-hosted program and tamper with the network communication. In this example, against a user's wish that only an aggregate function over her dataset is revealed, an adversarial host can repeatedly evaluate the approved function on different subsets of her dataset (a.k.a., a rewind-and-fork attack), and infer information about individual records. Additionally, a host may also deliver output only to a colluding subset of the intended recipients, which prevents fair distribution of the data.

Embodiments of the invention address these and other problems, individually and collectively.

BRIEF SUMMARY

Embodiments of the invention are directed to techniques for enabling users to control which entities are given access to which of their data as well as how that data is able to be used, while ensuring fairness amongst the parties to which the data is shared. In some embodiments, a user is able to create one or more information usage policies, which may include conditions under which data can be used. These policies are stored in a manner which preserves each of the user's modifications as well as actual usage of user information (e.g., on a blockchain). User information (e.g., information collected by a client device) is then subjected to the information usage policy before distribution of that information. To accomplish this, a data consumer may submit a request for information to a provider of the service described herein. In some cases, the service provider may forward the request to a host server, which may be a third party entity or other untrusted entity. The host server may determine, by compiling a current policy from a number of transactions stored on the blockchain, whether the request is an authorized request and respond appropriately.

If the request is determined to be authorized, then the host server processes the request within a private enclave such that the data is handled without being available to other applications running on the host server. During the processing of the request, the host server uses a cryptographic key stored in the private enclave to decrypt the requested data. The host server may then perform a number of computations on the requested data resulting in an output value. The output value may then be encrypted and written to a shared ledger multiple times for multiple receiving entities. In some embodiments, the output value may be encrypted for each receiving party using a public cryptographic key associated with that receiving party. Access to the encrypted output is then provided to each of the receiving parties simultaneously.

One embodiment of the disclosure is direct to a method comprising: receiving distribution instructions for private information relating to a user of a client device, the distribution instructions comprising an indication of a plurality of data consumers, encrypting the private information using a first cryptographic key, providing access to the encrypted private information to each of the plurality of data consumers, receiving, from each of the plurality of data consumers, an indication that the access to the encrypted private information was received by that data consumer, and upon confirming that each of the plurality of data consumers has been provided access to the encrypted private information, causing a second cryptographic key to be released to the plurality of data consumers, the second cryptographic key capable of being used to access the private information.

Another embodiment of the disclosure is direct to a computing system comprising: a processor; and a memory including instructions that, when executed with the processor, cause the computing system to, at least: receive distribution instructions for output data relating to a user of a client device, the distribution instructions comprising an indication of a plurality of data consumers, encrypt the output data using a first cryptographic key, provide access to the encrypted output data to each of the plurality of data consumers, receive, from each of the plurality of data consumers, an indication that the access to the encrypted output data was received by that data consumer, and upon confirming that each of the plurality of data consumers has been provided access to the encrypted output data, cause a second cryptographic key to be released to the plurality of data consumers, the second cryptographic key capable of being used to access the output data.

These and other embodiments of the invention are described in further detail below as well as in the attached appendix.

DETAILED DESCRIPTION

Figure 1:
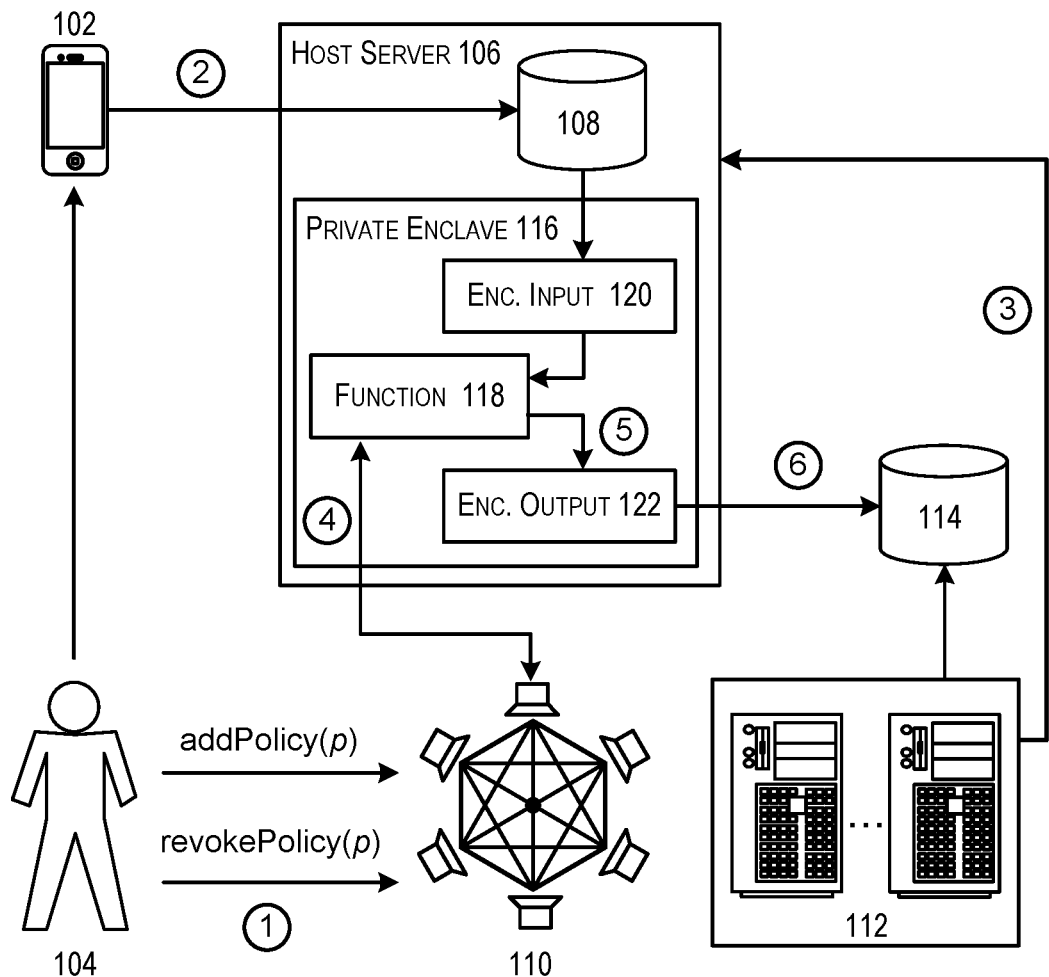
FIG. 1 depicts an example system for implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "blockchain" may include a distributed database. A blockchain can be used to maintain a continuously growing list of records called blocks. A blockchain can be used to maintain a record of transaction or events between parties in a way that is difficult to falsify. Each block in a blockchain may include several records as well as a hash of previous blocks in the blockchain. If a record in a previous block is changed, the hash may be disrupted in any following blocks. The result is that in order to falsify a given record, the hacker has to falsify that record and all subsequent records so that the hashes end up the same. This is extremely difficult in practice. Additionally, a blockchain may be distributed to a large number of entities via a distributed network. Any changes to the blockchain may be verified by comparing it to the numerous individual records.

A "blockchain ledger" is a series of records maintained according to a blockchain protocol. A full copy of a blockchain ledger may include every transaction ever executed by the system. Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant.

A "client device" may be a device that is operated by a user. Examples of client devices may include a mobile phone, a smart phone, a personal digital assistant (PDA), a laptop computer, a desktop computer, a server computer, a vehicle such as an automobile, a thin-client device, a tablet personal computer (PC), etc. Additionally, client devices may be any type of wearable technology device, such as a watch, earpiece, glasses, etc. The client device may include one or more processors capable of processing user input. The client device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The client device may comprise any electronic device that may be operated by a user, which may also provide remote communication capabilities to a network. Examples of remote communication capabilities include using a mobile phone (wireless) network, wireless data network (e.g., third generation of wireless mobile telecommunications technology (3G), fourth generation of wireless mobile telecommunications technology (4G), or similar networks), Wi-Fi, Wi-Max, or any other communication medium that may provide access to a network such as the Internet or a private network.

A "computation" may be any string with a set of attributes. A computation may be defined at least by a function, a policy, and identities of one or more input providers (consumers) and one or more output recipients (data consumers). Each computation may be identified using a unique identification number (e.g., a 64-bit number). Each computation may be recorded via a specification for that computation within a ledger. In some embodiments, a specification for each computation may be associated with a public key which is used to encrypt input data used in that computation. A specification for a computation may also specify public keys used to encrypt output data which to be provided to data consumers. A function associated with a computation may indicate one or more mathematical operations to be performed on input data in order to obtain a desired output data.

A "computing device" can be any suitable device or software module that is configured to process data. In some embodiments, a computing device may include communication capabilities such as using a mobile phone (wireless) network, wireless data network (e.g. 3G, 4G or similar networks), Wi-Fi, Wi-Max, or any other communication medium that may provide access to a network such as the Internet, an overlay network, or the like. Examples of computing devices include mobile phones (e.g. cellular phones), PDAs, tablet computers, net books, laptop computers, personal music players, hand-held specialized readers, server computers, etc. A computing device may comprise any suitable hardware and software for performing such functions, and may also include multiple devices or components (e.g. when a device has remote access to a network by tethering to another device—i.e. using the other device as a modem—both electronic devices taken together may be considered a single computing device).

A "cryptographic key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic key pair" may include a pair of linked cryptographic keys. For example, a key pair can include a public key and a corresponding private key. In a cryptographic key pair, a first cryptographic key (e.g., a public key) may be used to encrypt a message, while a second cryptographic key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on Rivest, Shamir, and Adelman (RSA) or elliptic curve cryptography (ECC). In some embodiments, a key pair may be generated using an asymmetric key pair algorithm.

A "decentralized network" can include a network in which no one single computing device or software module has control over all of the processing of the network. A "centralized network" may include a network in which a single computing device or node (or a relatively small number of the same) controls the processing of the network. Between the two, a decentralized network may be less likely to fail accidentally because it relies on many separate components that are not likely to fail at once. Additionally, decentralized systems are more expensive to attack and destroy or manipulate than centralized networks because decentralized networks lack sensitive central points that can be attacked at much lower cost than the economic size of the surrounding system. Additionally, it may be significantly more difficult for participants in a decentralized networks to collude to act in ways that benefit them at the expense of other participants.

An "enclave" or "enclave program" is an isolated region of memory, containing both code and data, which is protected by a trusted execution environment platform (i.e., where trust is only placed in the processor manufacturer). An enclave on a host computer is configured so that applications outside of the enclave cannot access the code and data within the enclave. In some cases, enclaves are protected from hardware attacks by the host computer via encrypting and integrity-protecting the enclave's cache lines prior to writing them to memory (e.g., dynamic random access memory (DRAM). An enclave may also provide "sealed storage," in which data may be stored in memory and in which that data is encrypted using secret keys known only to the processor manufacturer. Data that is "sealed" in this manner may be stored in memory of a host computer outside of the enclave. The sealed data can then only be decrypted and processed inside of the enclave.

The term "fair" refers to a notion that data consumers are each given the same opportunity to receive data. For the purposes of this disclosure, a fair system is one in which all or none of the eligible data consumers receive output data. In other words, if any data consumer gets output data, then all eligible honest data consumers must get that same output data for the system to be considered fair. Ensuring fairness is non-trivial as communications of output data as described herein are controlled by untrusted parties, which may collude with data consumers.

A "node" or "network node" may include a connection point in a communication network. A network node can be a physical electronic device that is capable of creating, receiving, or transmitting data (e.g., a server). In some embodiments, a network node may be a computing device within a record-keeping network (e.g., a blockchain network). A network node may be able to create a data package (e.g., a data payload), transfer a data package, receive a data package, validate a data package, access a central record, and/or perform any other suitable functions. Different types of network nodes may be able to perform different sets of functions within a recording network. In some embodiments, a network node may be associated with and/or operated by a resource provider such as an online service provider, a content provider, a certificate authority, a financial institution (e.g., a bank), a merchant, a transaction processing network, or any other suitable entity.

A "record" may include evidence of one or more interactions. A digital record can be electronic documentation of an interaction. A record can include a record identifier and record information. For example, record information can include information describing one or more interactions and/or information associated with the interactions (e.g., a digital signature). Record information can also include multiple data packets each of which include different data describing a different interactions. A record identifier can be a number, title, or other data value used for identifying a record. A record identifier can be nondescript, in that it may not provide any meaningful information about the information included in the record. Examples of records include medical records, academic records, transaction records, credential issuance records, etc. In some embodiments, a record can be stored in a block of a blockchain. In these embodiments, an individual block may include an individual record or a predetermined number of records, and a blockchain can be a series of records organized into blocks.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "signature" may include an electronic signature for a message or some data. A digital signature may be a numeric data value, an alphanumeric data value, or any other type of data including a graphical representation. A digital signature may be a unique data value generated from a message and a private key using an encrypting algorithm. In some embodiments, a validation algorithm using a public key may be used to verify the signature.

A "Software Guard Extension" (SGX) is a set of central processing unit (CPU) instruction codes that allows user-level code to allocate private regions of memory, called enclaves, that are protected from processes running at higher privilege levels. An SGX is designed to be useful for implementing secure remote computation, secure web browsing, and digital rights management (DRM).

The term "verification" and its derivatives may include a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key. For example, a verification process may involve independently generating a value to be verified (e.g., a hash value from provided data). The verification process may also involve performing a cryptographic operation on the information to be verified (which may involve the use of a public key for the entity associated with the information to be verified) to produce a plain text version of the information to be verified. The verification process may then involve comparing the plain text version of the information to be verified to the independently generated value to determine a match. If the two values match, then it is highly likely that the information to be verified was signed using the entity's private key. This verifies that the information likely originated from the entity which claims to have provided the information.

Details of some embodiments of the present invention will now be described in greater detail.

FIG. 1 depicts an example system for implementing at least some embodiments of the current disclosure. In FIG. 1, a client device 102 operated by a user 104 may be in communication with a host server 106 which collects user information from the client device 102. In this example, the collected information may be encrypted either by the client device 102 or by the host server 106 (e.g., using a public encryption key associated with the service described herein) and may be stored in a database 108. Additionally, the user 104 may be provided with the ability to alter information use policies via a decentralized network 110 (e.g., a blockchain network). One or more pieces of the collected information stored in database 108 may be requested from the host server 106 by a data consumer 112. In some embodiments, the data consumer 112 may additionally have access to an output database 114.

In some embodiments, the client device 102 may be any suitable electronic device operated by user 104 and capable of collecting and transmitting information. For example, the client device 102 may be a mobile phone, a smart phone, a personal digital assistant (PDA), a laptop computer, a desktop computer, a fitness tracker, or any other suitable electronic device. In some embodiments, the information collected may include information about the user 104. For example, the client device 102 may be configured to collect information about an activity performed by the user 104 or biometric information related to the user 104.

The host server 106 may be any electronic device capable of performing at least a portion of the functionality described herein. Although depicted in FIG. 1 as being separate from the decentralized network 110, it should be noted that the host server 106 may be a network node of the decentralized network 110 in some embodiments. The host server 106 may include a secure and private region of memory (i.e., private enclave 116) allocated via an SGX. The private enclave 116 may store one or more cryptographic keys. For example, a private key associated the service described herein may be stored within the private enclave 116. It should be noted that because the processing described herein is performed on a private enclave 116, and because data in the private enclave is protected from even higher level privilege level applications, the processing can be performed on untrusted devices even though the processing involves sensitive data. It should be noted that when the host server 106 is an untrusted entity (e.g., a network node of the decentralized network 110), the information may be encrypted by the client device 102 before being provided to the host server 106, thereby preventing the host server 106 from accessing that data.

The decentralized network 110 may be any suitable combination of multiple electronic devices configured to store data in a decentralized manner. In some embodiments, the decentralized network may be a blockchain network that stores data (e.g., policy data) within a blockchain. In at least some of these embodiments, a blockchain ledger for the blockchain network may store transactions related to policy changes submitted by a number of users. For example, a user 104 may add or revoke various information use policies, wherein each policy addition/revocation may constitute a transaction. In this example, a current status of any given information usage policy associated with a particular user and/or data consumers 112 may be assessed by identifying the latest transactions in the blockchain ledger associated with the information usage policy.

Each data consumer 112 may be any electronic device configured to use or consume data collected by the client device 102. In some embodiments, a data consumer 112 may be a computing device operated by a third party entity (i.e., an entity unaffiliated with the host server 106 and/or the client device 102. Each data consumer 112 may maintain an account associated with the user 104 and/or the client device 102 (which may be separate from an account maintained by other data consumers 112).

By way of illustrating at least some interactions that may occur using the system described herein, consider the following exemplary scenario in which data is collected via a client device 102 and provided to a data consumer 112. At step 1 of the illustrative scenario, a user 104 may add or revoke various information usage policies within a blockchain network (decentralized network 110). For example, the user may indicate that one or more third party entities (i.e., a data consumers 112) are allowed to use his or her information in a particular way or are authorized to receive a specified subset of his or her information. This indication would then constitute a transaction which is written to a block. The block is then added to a blockchain ledger within a chain of similar blocks. This process is described in greater detail below.

In this illustrative scenario, the client device 102 may collect information about the user 104 and may transmit that information to the host server at step 2. The information may be collected in a number of ways. In some embodiments, the user 104 may provide information to the user device 102. For example, the user may enter text or user selections into the client device 102. In some embodiments, the client device 104 may include one or more input sensors which collect information about the user 104. In some embodiments, the information may include tracking information related to activities performed by the user. For example, the information may include an indication of a number of steps that the user has walked in a day or websites that the user has visited. In some embodiments, an implementation of the disclosure may involve only a type or category of information. In some embodiments, an implementation of the disclosure may involve a number of different types or categories of data. The information provided to the host server 106 may be encrypted and stored in a database maintained by that host server 106.

After the host server 106 has received information from the client device 102, it may receive a request to provide that information from the user to one or more data consumers 112 at step 3. In some embodiments, the request may be received from the one or more data consumers. The request may include some function 118 to be performed upon the information. In some embodiments, the request may also include a public key associated with each of the data consumers 112. Upon receiving the request, the request may be processed within a secure execution environment (e.g., private enclave 116) which is protected from other applications running on the host server 106. In performing this processing, the private enclave may receive the information as an encrypted input 120. At step 4, the processing performed by the private enclave 116 may involve obtaining policy information from the blockchain network 110. Based on that policy information, the private enclave may determine whether or not each of the data consumers 112 has authority to receive the processed information which has been requested (in accordance with a particular function). It should be noted that step 4 may be performed by the private enclave 116 or it may be performed by an application on the host server 106 outside of the private enclave 116 (e.g., before initiating the processing on the private enclave).

If the private enclave 116 determines that each data consumer 112 does have authority to receive the requested information, then the private enclave 116 may then decrypt the encrypted input 120, perform the one or more functions 118 indicated in the request on the information, and generate one or more encrypted outputs at step 5. The private enclave 116 may then report the performed function 118 to the blockchain record for a transaction of that function 118 to be recorded. If the private enclave 116 determines that a data consumer 112 does not have authority to receive the requested information, then the private enclave may respond to the request with a denial, raise an error, provide encrypted results for only the data consumers 112 that do have authority, or simply do nothing. In some embodiments, a data consumer's attempt to access the information may be reported to the blockchain network 110 to be recorded.

At step 6, the data consumers 112 may be provided with access to the information. It should be noted that there are multiple ways in which this may be accomplished. The encrypted output 122 may be provided directly to the data consumer 112 or it may be stored in a database of encrypted output (e.g., output database 114) and the data consumer 112 may be provided a reference (e.g., an address or link) to the encrypted output 122 stored in that database. In some embodiments, the encrypted output 122 may be encrypted using a public key associated with each data consumer 112. This enables each data consumer 112 to decrypt and access the information from the encrypted output using a private key associated with that data consumer 112. In some embodiments, the private enclave may maintain a set of cryptographic key pairs for use in generating encrypted output 122. In these embodiments, the encrypted output 122 may be encrypted using a cryptographic key selected (e.g., at random) from the set of cryptographic key pairs. The corresponding key from the selected cryptographic key pair may then be provided to the data consumer 112 to be used to decrypt the encrypted output 122. In some embodiments, the cryptographic key used to encrypt the encrypted output 122 may be a symmetric cryptographic key (e.g., wherein the same cryptographic key is used to both encrypt and decrypt the data). In those embodiments, the data consumer 112 may be provided with the symmetric cryptographic key. In this way, each data consumer is provided access to the requested information while preventing the entity that maintains that data (which may be an untrusted party) from being able to access that data.

In some embodiments, the output database 114 may be a shared ledger, such as an append-only ledger. When data is to be shared with multiple data consumers 112, the data may be written to the output database 114 multiple times (once for each data consumer 112), using different cryptographic keys (e.g., a public key for each data consumer 112). In some embodiments, the system may, upon providing each data consumer with a means of access to the encrypted output (e.g., via a link, reference, providing the encrypted output directly, etc.) receive a signed delivery receipt from that data consumer 112. Each signed delivery receipt may be signed by the respective data consumer using a private cryptographic key associated with that data consumer 112.

In some embodiments, access to the output data may be granted for all of the data consumers 112 at the same time upon receiving a complete set of delivery receipts. For example, a link provided to each data consumer 112 from which output data can be accessed may be inactive at the time that it is provided to a data consumer 112. In this example, each link to output data may be activated (i.e., enabled to obtain access) upon determining that all of the delivery receipts have been obtained. In some embodiments, an aggregate encoding of signatures from each of the data consumers 112 may be posted to the output database 114 or a ledger on the blockchain network 110.

In some embodiments, the encrypted output data and/or a decryption key may be provided to private enclaves operating on computing devices operated by each of the data consumers 112. In at least some of these embodiments, the private enclaves on each respective data consumer 112 may release the output data or decryption key to their data consumer upon receiving a release signal from the private enclave 116. In these embodiments, the output data provided to each of the data consumers may be encrypted using the same cryptographic key. A second (e.g., decryption) key may then be provided to the private enclave so that it may be provided to the data consumer 112 upon receiving an indication that the decryption key should be released.

Figure 2:
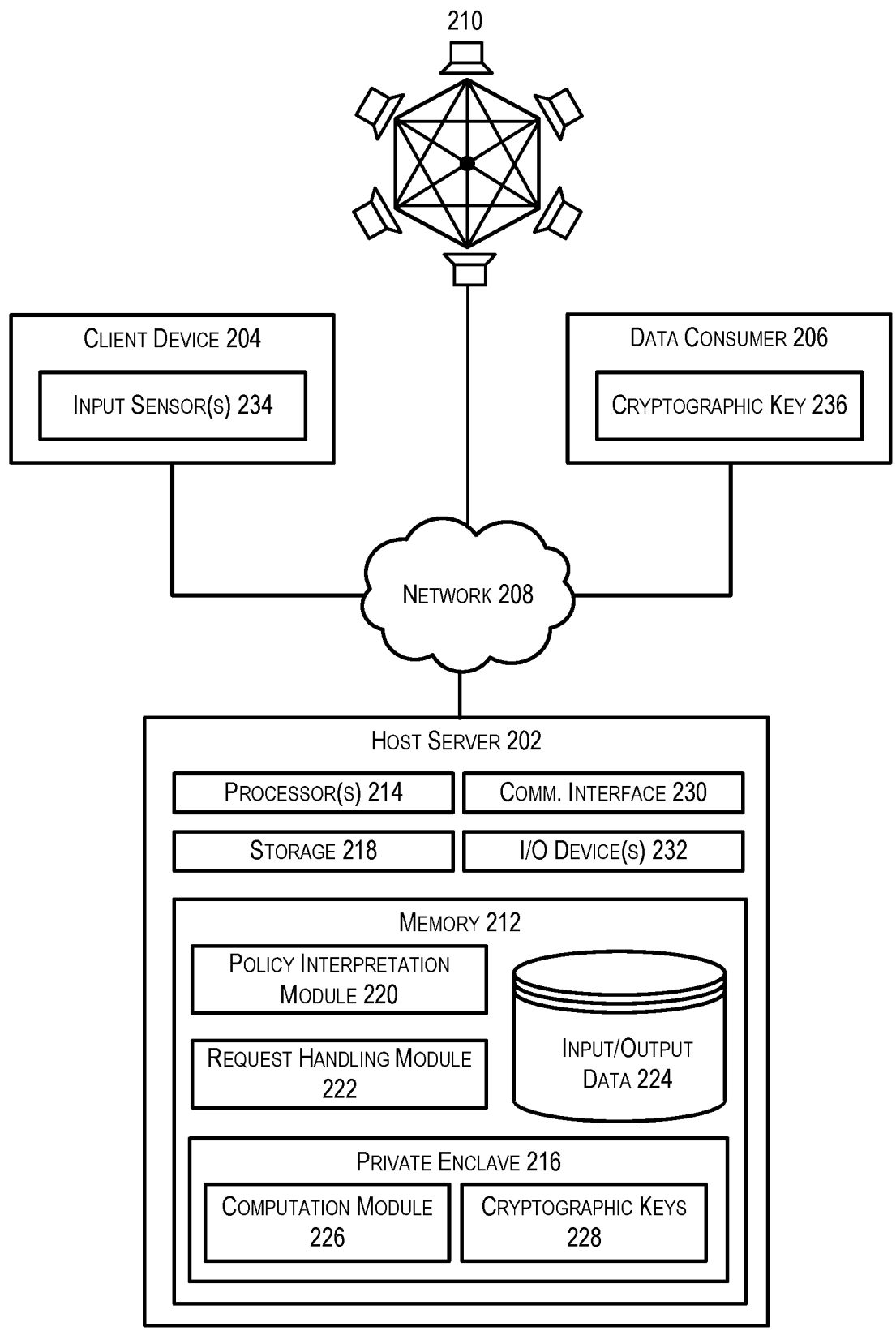
FIG. 2 depicts an example system architecture that may be implemented to enable controllable access to private data in accordance with embodiments of the disclosure.

FIG. 2 depicts an example system architecture that may be implemented to enable controllable access to private data in accordance with embodiments of the disclosure. In FIG. 2, a host server 202 may be in communication with a number of client devices 204 and data consumers 206 via a connection to a network 208. The network 208 may include some combination of interconnected electronic devices capable of routing communications between the electronic devices. The network 208 may include, or provide an ingress/egress to, a blockchain network 210 (or other suitable decentralized network). In some embodiments, the host server 202 may be an example host server 106 of FIG. 1.

In at least some embodiments, the host server 202 may include at least one memory 212 and one or more processing units (or processor(s)) 214. The processor(s) 214 may be implemented as appropriate in hardware, computer-executable instructions, firmware or combinations thereof. Computer-executable instruction or firmware embodiments of the processor(s) 214 may include computer-executable or machine executable instructions written in any suitable programming language to perform the various functions described. In some embodiments, the memory 212 may include a secure execution environment created using a software guard extension (SGX) hereinafter referred to as private enclave 216.

The memory 212 may store program instructions that are loadable and executable on the processor(s) 214, as well as data generated during the execution of these programs. Depending on the configuration and type of host server 202, the memory 212 may be volatile (such as random access memory (RAM)) and/or non-volatile (such as read-only memory (ROM), flash memory, etc.). The host server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the host server 202. In some embodiments, the memory 212 may include multiple different types of memory, such as static random access memory (SRAM), dynamic random access memory (DRAM) or ROM.

Turning to the contents of the memory 212 in more detail, the memory 212 may include an operating system and one or more application programs or services for implementing the features disclosed herein including at least a module for retrieving information usage data and determining whether to provide requested information (policy interpretation module 220) and a module for handling received requests (request handling module 222). The memory 212 may also include input and/or output data 224, which provides data provided to the host server 202 and/or data to be distributed to one or more data consumers 206. Additionally, the host server 202 may include any number of modules for enabling additional functionality, such as the functionality described later herein. Within the private enclave 216, the host server 202 may include functionality for performing one or more requested computations on data (computation module 226) as well as one or more cryptographic keys 228.

In some embodiments, the policy interpretation module 220 may, in conjunction with the processor 214, be configured to determine whether a particular request for information should be granted. To do this, the policy interpretation module 220 may retrieve information related to an information usage policy stored on the blockchain network 210. This may involve identifying a number of transactions related to the information usage policy to identify a current status of that policy. For example, the policy interpretation module 220 may identify policy additions, policy revocations, and performed functions recorded with respect to the information usage policy. In some embodiments, the policy interpretation module 220 may determine a current status of the information usage policy with respect to a particular type of information at issue and/or with respect to a particular data consumer 206 which has requested that information. The policy interpretation module 220 may then determine whether the request should be granted based on whether the request conflicts with the current status of the information usage policy. In response, the policy interpretation module 220 may provide an indication as to whether or not the request is authorized. It should be noted that although policy interpretation module 220 is depicted as running outside of the private enclave 216, the policy interpretation module 220 may run inside of the private enclave 216 in some embodiments.

In some embodiments, the request handling module 222 may, in conjunction with the processor 214, be configured to receive a request from a data consumer, initiate a computation module 226 on the private enclave 216, and provide resulting encrypted output (or a link to that encrypted output) to the requesting data consumer 206. The request handling module 222 may provide one or more pieces of data received in the request to the private enclave 216. For example, the request handling module 222 may provide a public cryptographic key (e.g., associated with the data consumer 206), a type of information requested, an indication of a function to be performed on the information requested, or any other suitable data to the private enclave 216 (e.g., as parameters in a method call). In some embodiments, the request handling module 222 may be configured to initiate the policy interpretation module 220 and may be further configured to initiate the computation module 226 upon receiving an indication from the policy interpretation module 220 that the request is authorized. In some embodiments, the request handling module 222 may be configured to store encrypted output to a database record or to transmit encrypted output to the data consumer 206 from which a request was received.

In some embodiments, the computation module 226 may, in conjunction with the processor 214, be configured to process a request for information in a manner that prevents the host server 202 (or other applications running on the host server 202) from gaining access to the processed information. As pointed out elsewhere, the private enclave 216 may be a secure execution environment implemented on a portion of memory 212 which is segregated from the rest of memory 212 such that applications (even those with higher privilege levels) are not able to gain access to the information processed on the private enclave 216. The computation module 226 may, upon determining that the request is authorized (e.g., via the policy interpretation module 220) be configured to decrypt the requested information stored on the host server 202. In some embodiments, the computation module 226 may be configured to perform some requested function on the requested information. For example, the submitted request may be for an average or mean associated with multiple data points. In this example, the computation module 226 may decrypt the values associated with the multiple data points and average the resulting values. The computation module 226 may be further configured to encrypt any resulting output values. In some embodiments, the output values may be encrypted using a public key associated with the data consumer 206 from which the request has been received. In some embodiments, a cryptographic key may be selected from a set of available cryptographic keys 228 maintained on the private enclave. The output values may then be encrypted using that selected cryptographic key. A corresponding cryptographic key (or the same cryptographic key in the case of a symmetric key) may then be provided to the data consumer 206.

The host server 202 may also contain communications interface(s) 230 that enable the host server 202 to communicate with a stored database, another computing device or server, one or more remote devices, other application servers, and/or any other suitable electronic devices. In some embodiments, the communication interface 228 may enable the host server 202 to communicate with other electronic devices on a network (e.g., on a private network). The host server 202 may also include input/output (I/O) device(s) and/or ports 232, such as for enabling connection with a keyboard, a mouse, a pen, a voice input device, a touch input device, a display, speakers, a printer, etc.

The client device 204 may be any electronic device capable of communicating with other electronic devices. For example, the client device 204 may be a mobile phone capable of wirelessly communicating with a host server 202 and/or a data consumer 206 (e.g., via network 208). In some embodiments, the client device 204 may be an example of client device 102 depicted in FIG. 1. The client device 204 may have installed upon it a number of input sensors 234 capable of collecting information about a user, one or more activities that the user is engaged in, the client device 204, an environment in which the client device 204 is located, or any other suitable data. In some embodiments, the client device 204 may have installed upon it a number of software applications. One or more of the software applications installed on the client device 204 may cause the client device 204 to transmit information collected by the client device 204 to the host server 202 for distribution to data consumers 206. In some embodiments, the client device 204 may also enable a user to modify information usage policies maintained on a blockchain network 210.

In some embodiments, the data consumer 206 may be an example of data consumer 112 depicted in FIG. 1, which may be configured to request and consume data. The data consumer 206 may be an entity which consumes data in order to provide a service or product. The data consumer 206 may maintain a number of accounts, at least one of which may be an account associated with a user and/or client device 204. In some embodiments, the data consumer 206 may provide back-end support for a mobile application installed upon the client device 204. In some embodiments, at least some information usage policies stored on the blockchain network 210 may pertain to a particular data consumer 206. In some embodiments, the data consumer 206 may store a cryptographic key 236 that can be used to access encrypted output data. In some cases, the cryptographic key 236 may be a private key associated with the data consumer 206. In some cases, the cryptographic key 236 may be a cryptographic key provided by the private enclave 216 (e.g., one of cryptographic keys 228).

Figure 3:
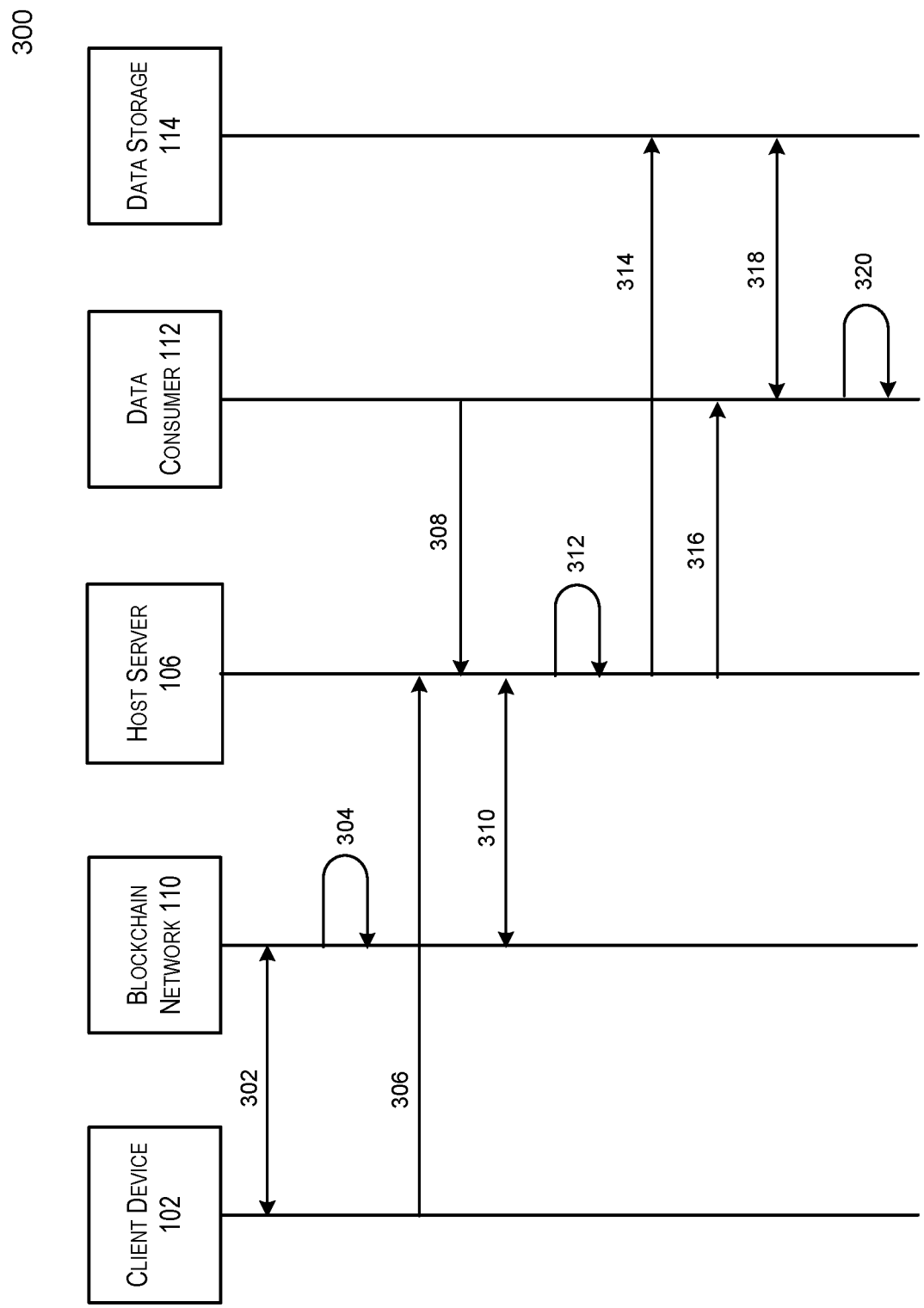
FIG. 3 depicts a swim lane diagram illustrating a process by which access to data may be provided in response to a request in accordance with at least some embodiments.

FIG. 3 depicts a swim lane diagram illustrating a process by which access to data may be provided in response to a request in accordance with at least some embodiments. In FIG. 3, a client device 102 may be in communication with a blockchain network 110 (e.g., an example of a decentralized network), and/or a host server 106 having a private enclave 116. The host server 106 may, in turn, be in communication with a number of data consumers 112. The host server 106 and the data consumers 112 may have access to a data storage 114 (e.g., a database). In some embodiments, the data storage 114 may be included in the memory of the host server 106. In some embodiments, the host server 106 may maintains an account associated with the client device 102 and/or an operator of the client device 102.

In some embodiments, the process may begin when a user of a client device 102 sets one or more information usage policies within a blockchain network 110 at 302. In some embodiments, setting the one or more information usage policies may be accomplished via a series of transactions which either add, revoke, or otherwise modify, information usage policies. At 304, the various transactions submitted by the user may be added to the blockchain ledger at 304. For example, for some information sharing policy p, the user may provide authorization to distribute the information at issue to entities A-Z for any purpose. The user may then revoke authorization to use the information to create targeted advertisements. The user may also revoke authorization for entities D and P to use their data. In this example, each addition/revocation may consist of a separate transaction which is written to the blockchain ledger distributed across the blockchain network 110. Upon assessing a current status of the information sharing policy p, it could be determined from the above transactions that the user has authorized distribution of his information to entities A-C, E-O, and Q-Z for any purpose other than creating targeted advertisements (which may be identified via a code). Hence, any request for the information relevant to information sharing policy p which complies with these requirements should be authorized.

At 306, the client device 102 may transmit information to the host server 106. The information transmitted by the client device 102 to the host server 106 may be encrypted. In some embodiments, the host server 106 may be operated on behalf of an untrusted entity. In these embodiments, the client device 102 may encrypt the information using a public key associated with the service described herein. In this way, the host server 106 is unable to access the information provided to it. In some embodiments, the host server 106 may be a trusted entity. In at least some of those embodiments, the information received by the host server 106 from the client device 102 may be encrypted by the host server 106. The encrypted received information may be stored on the host server 106 or in a location accessible to the host server 106. It should be noted that although step 306 is depicted as occurring after steps 302 and 304 in the diagram, step 306 may occur at any time in relation to those steps. For example, step 306 may occur before, after, or concurrently with step 302.

Subsequent to the client device 102 providing information to the host server 106, the provided information may be requested by a data consumer 112 at step 308. In some embodiments, the data consumer 112 may transmit the request directly to the host server 106. In some embodiments, the data consumer 112 may submit a request to a provider of the service disclosed herein and that service may route the request to the host server 106. The request may include a number of details relevant to the request. In some embodiments, the request may include a cryptographic key to be used to encrypt the requested data (e.g., a public key associated with the data consumer 112). In some embodiments, the request may include one or more functions to be performed on the requested data. In some embodiments, the request may include an address or location to place the requested data in and/or a communication channel to be used in providing the requested data.

Upon receiving the request for data, the host server 106 may determine whether that request for data is an authorized request. To do this, the host server 106 may retrieve a blockchain ledger from or otherwise access the blockchain network 110 that pertains to information usage policies at step 310. Upon retrieving the blockchain ledger, the host server 106 may determine a current status of the information policy pertaining to the requested data at 312. This may involve identifying, within the blockchain ledger, each of the recorded transactions that pertains to the requested information and assessing, based on those transactions, what information usage is authorized. In doing this, the host server 106 may identify the types of information usage which have been authorized by the user. The host server 106 may then compare the requested information usage with the types of information usage which have been authorized by the user to determine whether or not the request is authorized.

Upon determining that the request is an authorized request, the host server 106 may comply with the request by accessing the requested information, decrypting that information (within a private enclave) performing any relevant functions or computations on the decrypted information, and re-encrypting the outputted information using a cryptographic key. It should be noted that the outputted information may be encrypted using a different encryption key than was used to encrypt the information at step 302. In some embodiments, the host server 106 may store the encrypted output data on a data storage 114 as depicted at 314. In some embodiments, the encrypted output data may be provided directly to the data consumer 112 (or provided to a service provider to be forwarded to the data consumer 112).

In embodiments in which the encrypted output is stored in the data storage 114, the host server 106 may provide a cryptographic key to the data consumer 112 that may be used to access the encrypted output stored on the data storage 114 at 316. It should be noted that the cryptographic key may be provided by the private enclave within the host server 106 so that other applications running on the host server 106 may not gain access to that cryptographic key. Once the data consumer 112 has received the cryptographic key, the data consumer 112 may access the encrypted output in the data storage 114 at 318 and may use the cryptographic key to decrypt that encrypted output at 320.

Figure 4:
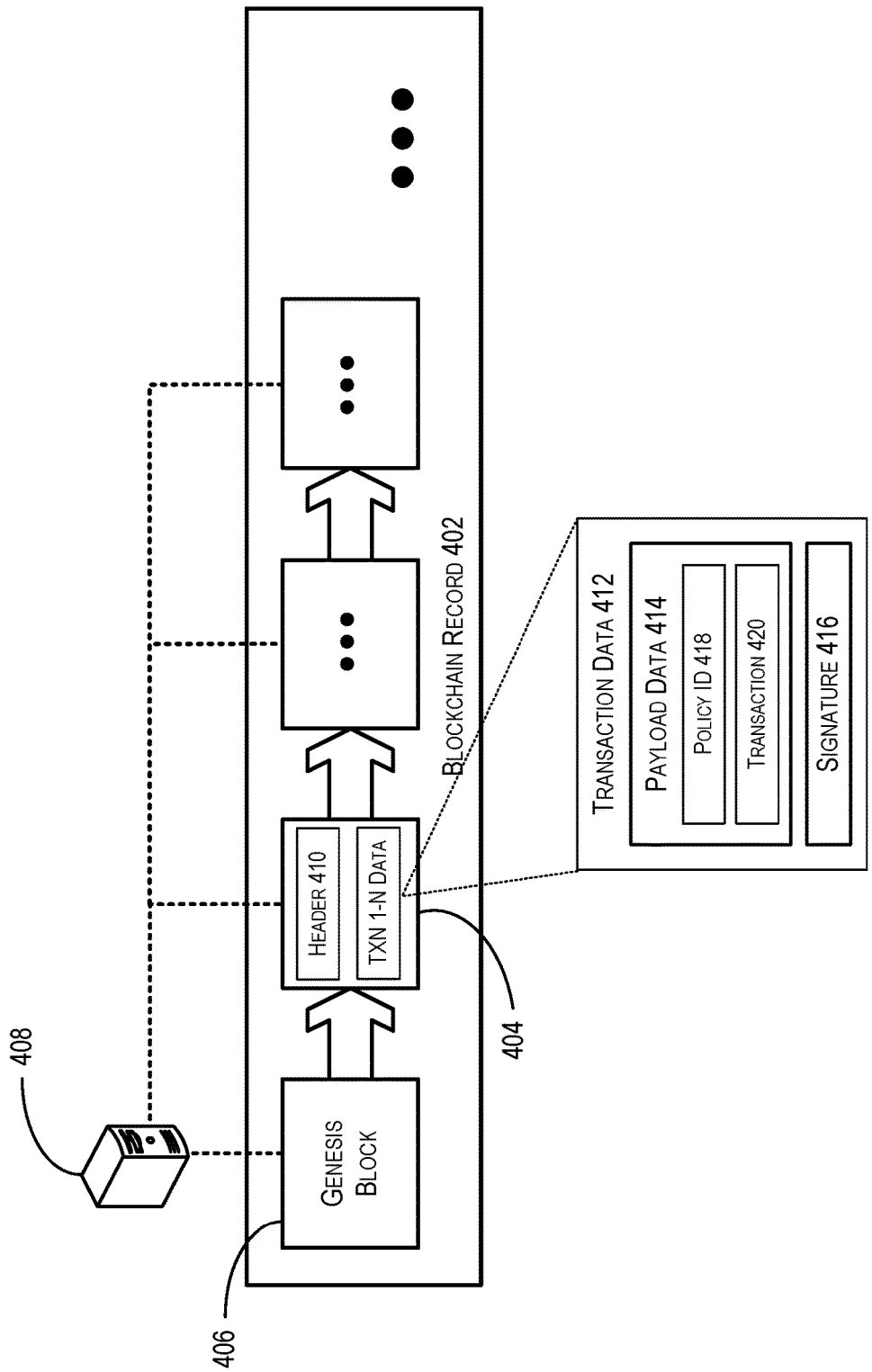
FIG. 4 depicts an example blockchain record that may be implemented in accordance with embodiments of the disclosure.

FIG. 4 depicts an example blockchain record that may be implemented in accordance with embodiments of the disclosure. In FIG. 4, a blockchain record 402 (also known as a blockchain ledger) may comprise a series of records of interactions which is distributed across a decentralized network. As depicted, the record may comprise a blockchain, in which a number of transactions related to various policies are processed in a block 404, and then distributed to a number of nodes of the decentralized network as part of the blockchain record 402. In particular, the blockchain record 402 depicts techniques by which a record of information usage policies may be stored, altered, and otherwise updated.

As described above, a number of blocks 404 may be appended to a genesis block 406. Although a genesis block 406 may be generated for the blockchain record 402, the contents of the genesis block may be disregarded in some embodiments. In other embodiments, the genesis block 406 may include an indication of an initial status of one or more information usage policies. In some embodiments, the genesis block 406 may be generated by a decentralized network node on behalf of a provider of the service described herein. In some embodiments, a separate genesis block 406 and/or blockchain record 402 may be generated for different types or categories of information usage policies. In some embodiments, a separate genesis block 406 and/or blockchain record 402 may be generated for each account.

As a user requests policy updates via a computing device 408, transactions may be generated for each request. Computing device 408 may be a network node of a blockchain network. Information related to the transactions may, in turn, be added to blocks 404. Each block 404 may include a header 410 and transaction data 412. The header 410 may include a hash of the previous block in the blockchain record 402 as well as a nonce value and various other information to be used to verify the block 404. Each block 404 may store transaction data 412 for some predetermined number N transactions.

In some embodiments, the transaction data 412 included in an block 404 may include payload data 414 and a digital signature 416. Payload data 414 may include a policy identifier 418 that indicates a particular policy to be updated as well as transaction data 420 that indicates a modification or other transaction to be recorded with respect to the policy. The payload data 412 may also include any other suitable information. For example, in some embodiments, the policy data 412 may include a public key associated with a data consumer to which that policy data 412 pertains. In some embodiments, a computing device 408 may sign transaction data 412 using a cryptographic key associated with the computing device 408 or a cryptographic key associated with the data owner (e.g., the user), generating the digital signature 416.

Each block 404 of the blockchain can be independently verified by independently generating the hash of the previous block using the given nonce value as well as by verifying the subsequent block. Additionally, each transaction data 412 is verifiable by verifying the digital signature. Blocks 404 can be searched for transaction data 412 pertaining to a particular information usage policy type, a particular user, a particular data consumer, or based on any other suitable factor. It should be noted that transactions recorded in the blockchain record 402 may include transactions conducted by entities other than the user. For example, each time that a request to access particular information is received, the blockchain record 402 may record the attempt to access that information. Because of this, information usage policies may include access limits, in that policies may limit the number of times that a particular entity may access the information within some period of time.

Figure 5:
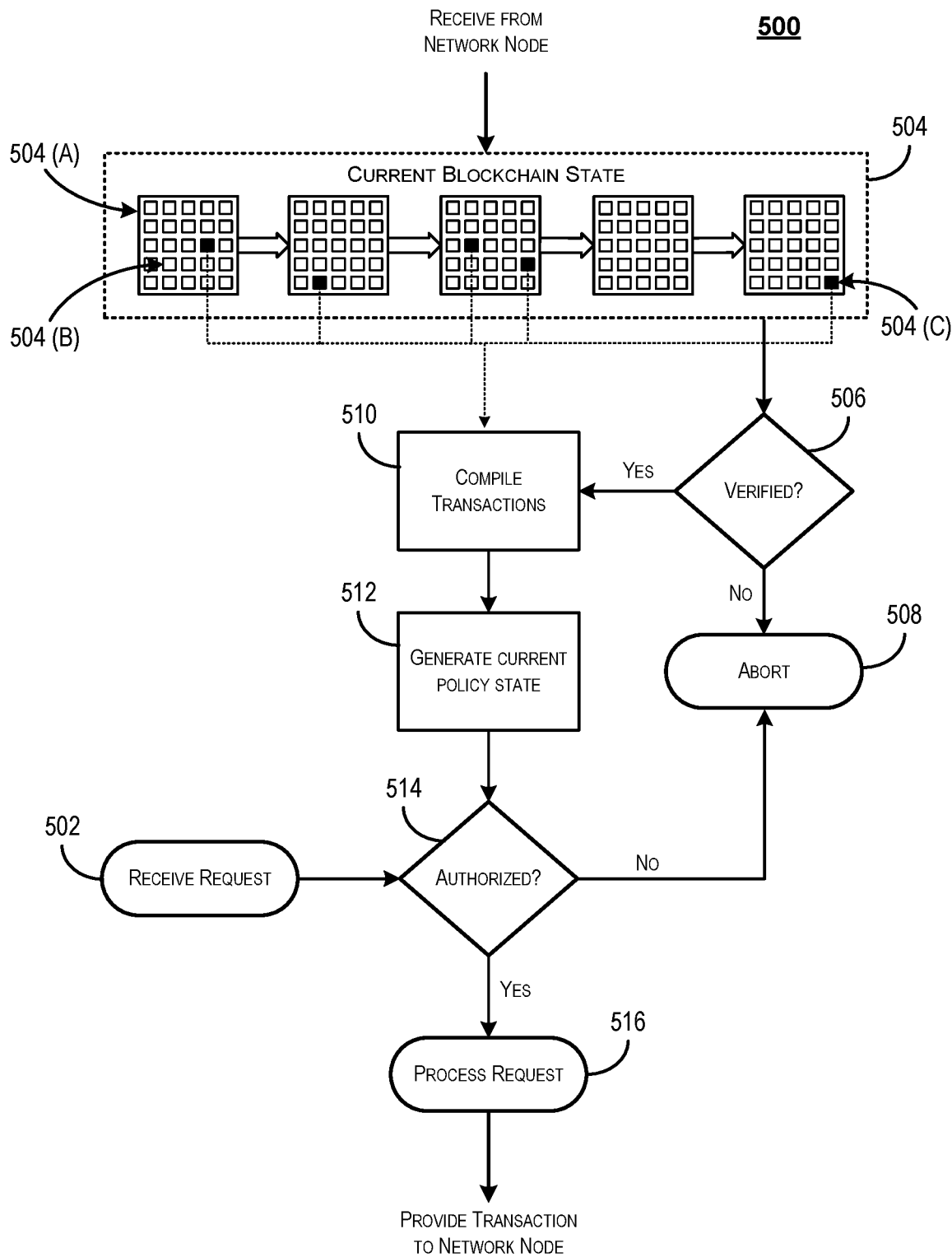
FIG. 5 depicts a flow chart illustrating a technique for determining whether a request is an authorized request using a blockchain in accordance with at least some embodiments.

FIG. 5 depicts a flow chart illustrating a technique for determining whether a request is an authorized request using a blockchain in accordance with at least some embodiments. In some embodiments, the process 500 depicted in FIG. 5 may be performed by a host server, such as the host server 106 depicted in FIG. 1.

In at least some embodiments, process 500 may begin at 502 when a request is received from a data consumer for user data. In some embodiments, the request may be a request for data that has been collected by a client device being operated by the user.

In some embodiments, the host server may receive, from a blockchain network node, a current blockchain state at 504. The depicted blockchain state depicts a number of blocks 504 (A), each of which include 25 transactions (depicted as smaller boxes 504 (B)). Within current blockchain state, the blockchain recorder or ledger may have recorded a number of transactions relevant to the received request (indicated as filled boxes 504 (C) within blocks).

At 506, the host server may verify that the user has set an information usage policy related to the request and that the received current blockchain state is authentic. In some embodiments, even if the user has not set an information usage policy related to a particular data consumer, a default data policy may exist which covers the request. In some embodiments, the system may require that the user create a relevant policy for user data prior to receiving a request for that user data. In some embodiments, verifying that the received current blockchain state is authentic may involve contacting other host servers on a network and comparing the received current blockchain state with current blockchain states stored by those other host servers. In some embodiments, the verifying that the received current blockchain state is authentic may involve checking digital signatures and/or hash values within the received current blockchain state.

Upon determining that either the user has not set an information usage policy that would be relevant (and if no default policy is available) or upon determining that the authenticity of the received current blockchain state cannot be verified, the process 500 may involve aborting the request at 508. In some embodiments, the host server may return a notification indicating that the request cannot be completed. In some embodiments, the host server may simply raise an error, which may be handled by the data consumer via an error handler.

Upon verifying that the user has set an information usage policy related to the request and that the received current blockchain state is authentic, the process 500 may involve identifying and compiling a number of transaction records which are relevant to the received request. In some embodiments, each transaction within the blockchain record may be identified which pertains to the request. For example, the blockchain record may be queried for transaction records relating to a particular data consumer, user, function, time period, or any other factor related to the request. Each of the identified transaction records may be compiled into a set of relevant transaction records at 510.

Once the transaction records relevant to the received request have been compiled, the process 500 may involve generating a current policy state at 512. This may involve parsing each of the transaction records in the set of relevant transaction records to determine which policies have been added, which have been revoked, and what information has already been provided to what data consumers. In some embodiments, this may also involve determining if there are any limitations on data usage included in the policy and the extent to which those limitations have been met. For example, an information usage policy may indicate that a particular data consumer may request a particular piece of user data indicated in the request only five times per day. In this example, the system may identify a number of transaction records from the current date in which the data consumer has requested the particular piece of user data. In this example, if the number of transaction records from the current date which indicate a successful request for the data exceeds five, then the current policy state may reflect that the data consumer cannot access the particular piece of user data.

The process 500 may then involve determining whether the received request is an authorized request at 514. In some embodiments, this may involve determining whether the received request is in compliance with the generated current policy state. In some embodiments, the request may be determined to be in compliance with the generated current policy state if the requested information is indicated as being available to the data consumer. In some embodiments, the request may be determined to be in compliance with the generated current policy state if the requested information is not indicated as being unavailable to the data consumer. If the request is determined to be an authorized request, then the process may proceed to 516 and the request may be processed. This step is described in greater detail elsewhere. If the request is determined not to be an authorized request, then the request may be aborted at 508.

Figure 6:
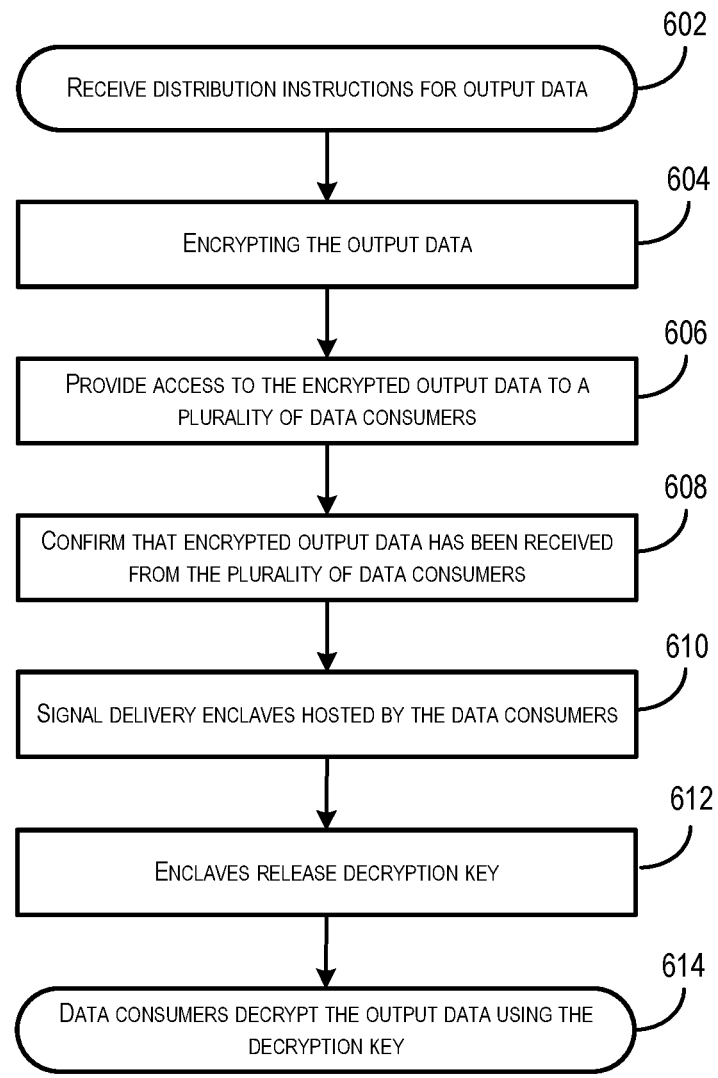
FIG. 6 depicts a flow diagram illustrating a process for providing requested information to a plurality of data consumers in a fair manner in accordance with at least some embodiments.

FIG. 6 depicts a flow diagram illustrating a process for providing requested information to a plurality of data consumers in a fair manner in accordance with at least some embodiments. In some embodiments, the process 600 depicted in FIG. 6 may be performed by a host server, such as the host server 106 depicted in FIG. 1. In some embodiments, the process 600 may be performed by an enclave hosted by a computing device (e.g., host server 106), where the enclave is an isolated region of memory protected by a trusted execution environment platform which is separate from other memory of the computing device. In these embodiments, the output data is not available to other applications running on the computing device outside the enclave. In some embodiments, the computing device may be operated by a data consumer of the plurality of data consumers. Each of the plurality of data consumers may be untrusted entities.

In some embodiments, process 600 may begin at 602, upon receiving distribution instructions for output data. In some embodiments, the plurality of data consumers may be identified from a specification for a computation used to generate the output data, the specification being retrieved from a public ledger (e.g., a blockchain ledger).

At 604, the process 600 may involve encrypting the output data using a first cryptographic key. In some embodiments, the output data may be encrypted using an symmetrical cryptographic scheme. In other words, the same cryptographic key may be used to both encrypt and decrypt the output data. In these embodiments, a second cryptographic key provided to the data consumer may be the same as the first cryptographic key used to encrypt the output data. In some embodiments, the output data may be encrypted using an asymmetrical cryptographic scheme. In other words, the cryptographic key used to encrypt the data may be different from the cryptographic key used to decrypt the output data.

At 606, the process 600 may involve providing access to the encrypted output data to a plurality of data consumers. In some embodiments, the encrypted output data is written to a memory location at which each of the plurality of data consumers are able to access the encrypted output data. In some embodiments, the encrypted output data is transmitted to each of the plurality of data consumers. In at least some embodiments, the encrypted output may be further encrypted using a public key associated with a data consumer. For example, each of the plurality of data consumers may be provided access to the encrypted output data that is further encrypted using its respective public key.

At 608, the process 600 may involve confirming that the encrypted output data has been received by each of the plurality of data consumers. This may involve receiving, from each of the plurality of data consumers, an indication that the access to the encrypted output data was received by that data consumer. In some embodiments, the indication that the access to the encrypted output data was received by a data consumer may be a signed delivery receipt from that data consumer, the delivery receipt being signed using a private key associated with the data consumer. In some embodiments, the process 600 may further involve generating an aggregate encoding of each of the indications that the access to the encrypted output data was received. For example, the enclave may aggregate the signed receipts received from each of the data consumers and may post that aggregate onto a ledger.

In some embodiments, the process 600 may further involve confirming that each of the plurality of data consumers has not already been provided access to the encrypted output data. In some embodiments, upon confirming this, the process 600 may further involve writing an entry to the ledger indicating that the plurality of data consumers has been provided access to the encrypted output data.

At 610, the process 600 may involve transmitting a signal to one or more enclaves hosted by respective data consumers. In some embodiments, the signal is not sent to any of the enclaves (and the second cryptographic key is not released to any of the plurality of data consumers) if an indication that the access to the encrypted output data was received is not received from all of the plurality of data consumers within a timeout window. In other words, the signal may not be sent unless signed receipts are received from all data consumers within the timeout window. If not, then the process 600 may be aborted and restarted. Alternatively, the process may restart from 606 above.

At 612, the process 600 may involve causing the one or more enclaves to release a second cryptographic key to their respective data consumers. It should be noted that each of the first and/or second cryptographic keys (which may be the same or different keys) may be stored in memory outside of the enclave performing the computation. To do so, the cryptographic key may be "sealed," or in other words, encrypted using a separate cryptographic key known only to the processor. At 614, the process 600 may involve the data consumers decrypting the encrypted output data using the provided second cryptographic key.

A more specific description of some of the embodiments can be described. The description is in the context of the embodiments described above. In this example, a data consumer may submit a request to compute some piece of sensitive data. In some embodiments, this request (referred to hereinafter as message 0) may be signed by the data consumer using a private key associated with that data consumer. Message 0 may be transmitted to a node of a distributed network, where it may be processed by that node as described below.

More specifically, message 0 may include the following data elements: msg0=invoke, p, in, and $\text{sign}_{PK\_data\_consumer}$ (invoke|p|digest(in)), wherein "p" is a policy, "in" is input data, and "invoke" is a command to invoke a computation process in the receiving node. In a more specific example, if the goal of the data consumer is to obtain from the node a total number of steps that one of its users has walked during a week, the "in" may be the number of steps (e.g., 3000) taken by the user during a single day in the week. The user may have a smart device (e.g., a smart watch) which tracks the number of steps taken by the user and the data consumer may be a company that sells the smart watch. The policy may be that the data consumer is only able to receive a total number of steps taken by the user over a given time period and is not able to receive any other data associated with that user's activity.

Upon receiving message 0, the node may invoke a secure enclave, as described above, to (upon determining that the data consumer should be granted the data based on the policies for that data) perform the computation, providing message 0 and a hash of the latest block (h) as arguments. The node may also receive a portion of the blockchain (described above), up to the latest block (h). In some embodiments either the node or the enclave may identify and retrieve policies relevant to the request (p). After completing the computation, the enclave may generate message 1, which may include a digest of stored data. It should be noted that message 1 may be encrypted and/or signed. In this scenario, the digest of stored data may include a computed value from stored raw data. It should be noted that some policies may allow a data consumer access to certain digests whereas other policies prevent that same data consumer from accessing the underlying raw data.

More specifically, message 1 may include the following data elements: record, p, nonce, in, out, and $\text{sign}_{Enclave}$ (record|p|nonce|digest(in)|digest(out)|h), where "p", "h," and "in" are described above. "Record" may be a command to record information to the blockchain, and "out" may be the output of the computation by the node or secure enclave. Following on the above example, "out" in this example may be the total number of steps that the user has taken in the week. For example "out" may be 22,538 steps.

Upon creation of message 1, the enclave may record its creation within the blockchain (to record the attempt to access the data by the data consumer). To record message 1 into the blockchain, message 1 may be transmitted to each of the nodes in the blockchain network. In the blockchain network, a miner or node in the blockchain network may propose a block containing message 1. Once message 1 has been accepted on the blockchain (with negligible probability of being reversed), the enclave can reveal a key that encrypted the output.

Note that in some embodiments, a miner performs some checks before the block can be accepted onto the blockchain. For example, in some embodiments, the node enclave may contact v other voter enclaves to collect v votes regarding the validity of the hash of the latest block. In this example, each voter of the v voter enclaves responds to the node with a message 2 (which includes a vote decision). Message 2 may or may not be signed. The responses in each received message 2 may be tallied in order to determine that at least some threshold (c) of the voters agree on the validity of the generated block. The generated block (block h') for which c or more voters agree is valid is then appended to the blockchain. In some embodiments, before concluding that the block h' is valid, the node enclave first checks to see that h' is ahead of the record block (e.g., "h" above in message 1) by some predetermined number of blocks (e.g., 6 blocks). Note that the block may be considered to have a negligible probability of being reversed once the block has achieved a predetermined depth (e.g., n blocks in).

The data elements in an exemplary message 2, from a node "i", may include the following: $\text{msg\_2i}=\text{sign}_{node\_i}$ (p|nonce|h_i|decision), where "decision" is the node i's vote, and h_i is the hash of the latest block as determined by node i.

In an alternative approach, the system, which may include a data producer, may specify an entity to play the role of a timestamp server, which signs requests for the latest converged block header. For example, the data producer broadcasts a hash of a block that is at a block height some threshold amount lower than the longest chain it has seen (the hash of the block may be h' as discussed above). Similar to above, in this approach the node enclave can check to see that h' is ahead of record block by the threshold amount blocks.

Once the block h' has been written to the blockchain by the miner and once the node enclave determines that h' is ahead of record block by the threshold number of blocks, the node enclave may release the requested data to the data consumer. To do this, the node enclave may generate a message 3 that includes a cryptographic key (e.g., an output key) which can be used to decrypt the requested data (e.g., where the requested data is stored in an accessible database entry in encrypted form). Message 3 may then be transmitted to the data consumer. In some embodiments, message 3 may be encrypted using a public key associated with the data consumer. The data consumer may then access the data using the provided cryptographic key. The data consumer may then decrypt the encrypted computed value (e.g., 22,538 steps) using its private key corresponding to the public key that was used to encrypt the computer value.

An example of message 3 may be as follows: $\text{msg\_3}=\text{enc}_{PublicKey\_Data\_Consumer}(\text{output\_key})$, where "output key" is a key that may be provided to the data consumer to decrypt a computation result such as "out" as described above.

As noted above, the system according to embodiments may be configured to resolve validity challenges related to one or more blocks using various consensus algorithms. For example, the system may employ a voting consensus model (in which each node is able to "vote" on which block it believes to be valid) or the system may employ a proof of work (PoW) model (in which nodes compete to "mine" blocks by performing expensive computations). In some embodiments, the system may employ some combination of voting and PoW protocols. It should be noted that, in some embodiments, a block may be required to be ahead of record block by some predetermined number of blocks in order to be considered valid. For example, the system, when retrieving policy data, may ensure that the blocks including the latest policy transactions are at least 6 blocks ahead of the record block before retrieving that policy data or before providing requested data.

Figure 7:
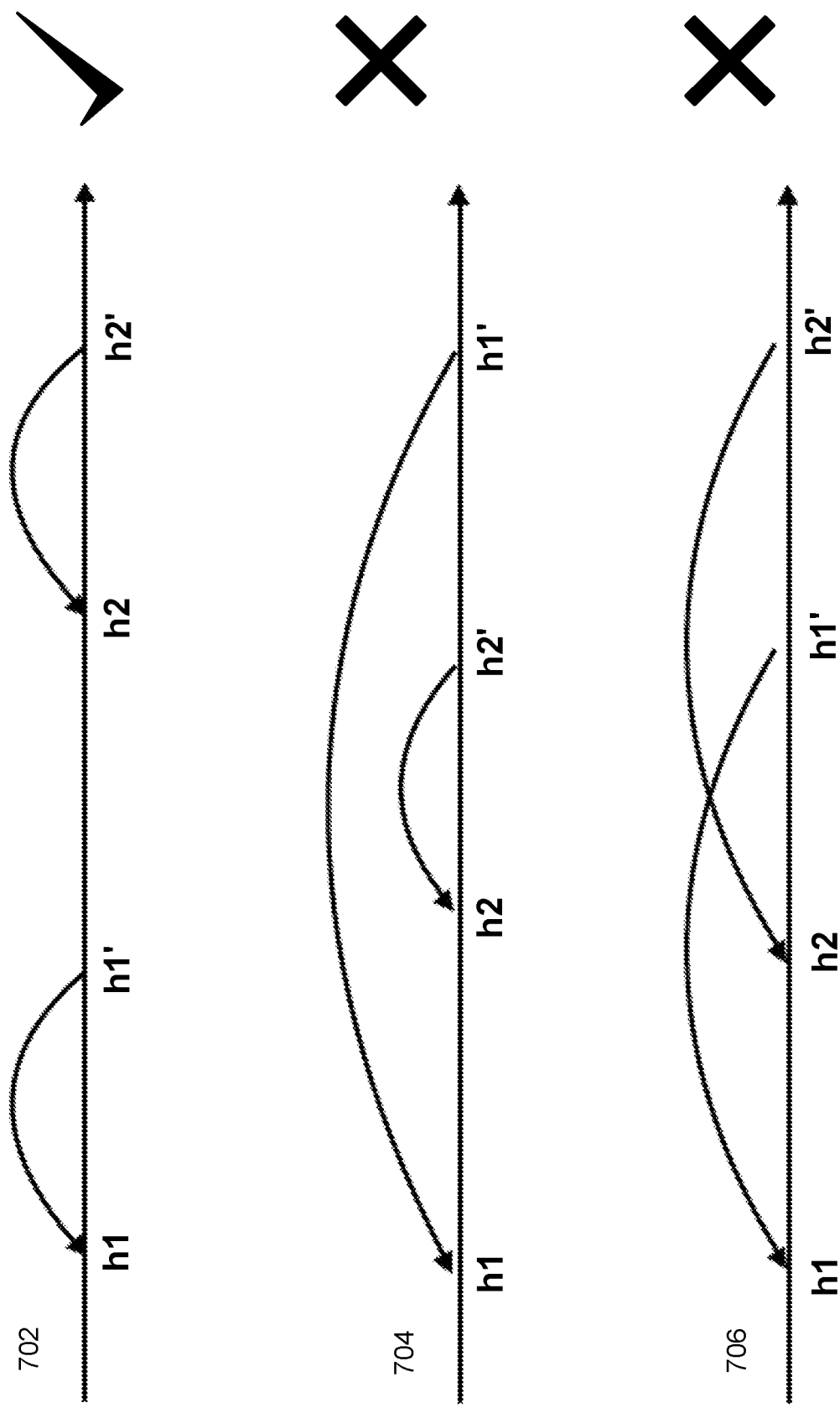
FIG. 7 depicts an example of various checks that may be performed by the system to ensure that blocks in a ledger are valid in accordance with embodiments of the disclosure.

FIG. 7 depicts an example of various checks that may be performed by the system to ensure that blocks in a ledger (i.e., a blockchain) are valid in accordance with embodiments of the disclosure. As alluded to above, consensus algorithms can be used to verify the authenticity of distributed blockchain platforms and are the process of building agreement among a network of mutually untrusted participants. Although a number of consensus algorithms are available (e.g., Nakamoto Consensus), additional checks may be necessary for the disclosed system in order to prevent concurrency issues. For example, the disclosed system may be configured to ensure that the writing of consecutive blocks to the blockchain does not overlap.

With respect to FIG. 7, consider scenarios 702, 704, and 705. In scenario 702, h1 may be a hash of a latest block in a blockchain at the time that a compute enclave performs a requested computation for a particular interaction (e.g., calculate the number of steps for a user in a week). h1' may be a hash of a block that nodes in the blockchain network that nodes agree that that the computation and/or interaction is to be recorded. h2 may be a hash of a block at the start of a requested computation for a second interaction by the same compute enclave, and h2' may be a hash of a block which includes the second interaction (after the nodes agree on that block). Scenario 702 shows that each interaction processed by a compute enclave can occur sequentially according to the order of the requested computations.

Scenarios 704 and 706, on the other hand, depict scenarios in which writing blocks to the blockchain may be found inappropriate. For example, in 704 and 706, h1 may be a hash of a latest block in a blockchain at the time that a compute enclave performs a requested computation for a particular interaction (e.g., calculate the number of steps for a user in a week). h1' may be a hash of a block that nodes in the blockchain network that nodes agree that that the computation and/or interaction is to be recorded. h2 may be a hash of a block at the start of a requested computation for a second interaction by the same compute enclave, and h2' may be a hash of a block which includes the second interaction (after the nodes agree on that block). However, h1' in this example, is determined after a second computation is performed by the secure enclave, so the secure enclave is not completing a requested computation for an interaction before beginning a subsequent computation on another interaction. This may indicate that the particular secure enclave/node is malicious or is not functioning properly. In such cases, the other nodes in the network may prevent such subsequent interactions from being written to the blockchain.

Figure 8:
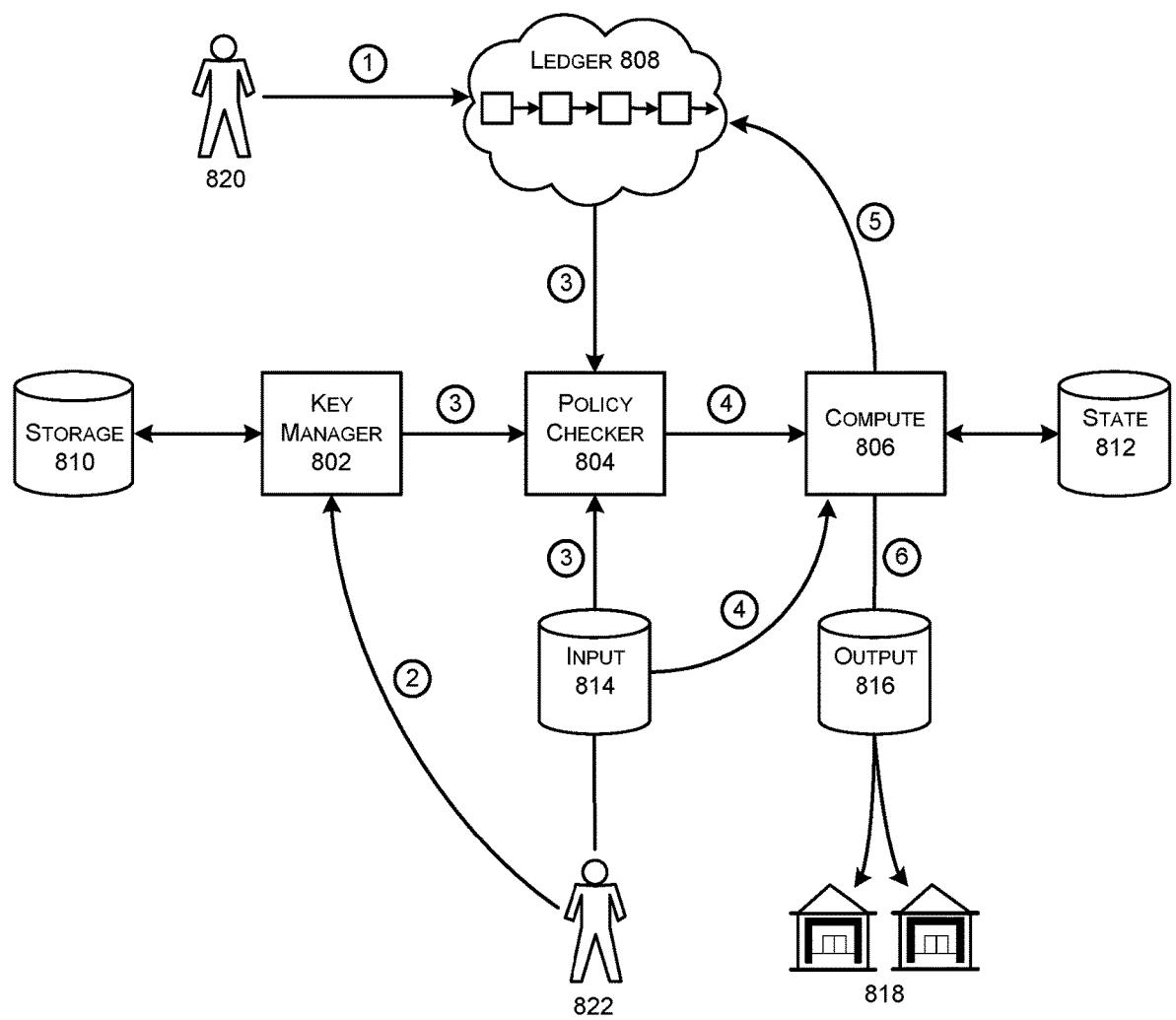
FIG. 8 depicts an illustrative example of techniques for completing a policy-compliant computation using enclaves and a shared ledger in accordance with at least some embodiments.

FIG. 8 depicts an illustrative example of techniques for completing a policy-compliant computation using enclaves and a shared ledger in accordance with at least some embodiments. As depicted in FIG. 8, the techniques may involve multiple enclaves, such as a key manager enclave 802, a policy checker enclave 804, and a compute enclave 806. Each of the enclaves 802-806 may have access to a ledger 808, which provides an immutable record of policies as well as data transactions conducted in relation to those policies. The techniques may also utilize one or more data storage repositories, which may be implemented outside the enclaves. For example, the techniques may use a persistent data storage 810, which stores key data, state data 812, which stores a current state for a policy, input data 814, which stores (encrypted) consumer data for use as input to one or more computations, and output data 816, which stores computation outputs to be provided to one or more data consumers 818.

Techniques for completing a policy-compliant computation using enclaves and a shared ledger will now be described by way of discussing interactions between the various components illustrated in FIG. 8. These interactions are described as process 800.

At step 1 of process 800, a user 820 may create a computation and may record a specification for that computation in the ledger 808. Any user 820 can create a computation to be added to the ledger 808. In some cases, the user 820 may be a user associated with a data consumer 818. In some cases, the user 820 may be an input provider 822 whose data is being distributed to data consumers.

By way of illustrative example, an agreement may be reached between an input provider 822 and at least one data consumer 818 to use the following computation:

```
computation {
    id: 525600, /* unique id */
    inp: [ ("txs":vk_Alice), ("db":vk_Acme) ],
    out: [ ("rprt":[pk_Acme,pk_BankA,pk_BankB])],
    policy: 0xcoff..eeee /* 8r 2 txs. fresh(r) */
    func: 0x1337...c0de, /* aggregate function */
}
```

In the above example, any party may add this computation's specification to the shared ledger. The "id" field may be any value that uniquely identifies this computation in the system (e.g., a 64-bit value). The "inp" field may list a set of named inputs, along with the public key of the input provider 822 (who may be expected to sign those inputs). Similarly, the "out" field may list a set of named outputs, where each output has one or more recipient data consumers 818 (the output may be encrypted under their respective public keys). The inputs and output data structures can be of one of several types, including an unstructured file, lists, key-value store, or any other suitable structure. The "func" field may uniquely identify the function f. In some embodiments, this may be done using the cryptographic hash measurement of the machine code program implementing function f. In this example, f may be evaluated over the inputs "txs" and "db." In some embodiments, a history-dependent guard may be included within the attribute "policy." Similar to function f, policy may be specified by the cryptographic hash measurement of machine code implementing that policy.

A specification stored in the ledger 808 for a computation may include a public key associated with (e.g., bound to) that computation. In some embodiments, this public key may be generated by the key manager enclave 802. In these embodiments, a private key corresponding to a public key associated with a computation may be sealed and stored in storage 810. The sealed private key is then only provided to a policy checker enclave 804 and/or compute enclave 806 which is working on that computation. It should be noted that by binding cryptographic keys to computations, rather than raw input data, the system enables reuse of inputs across function evaluations and across computations, without having to duplicate the data. It should be noted that the persistent storage 810 may store the private key even though it lies outside of an enclave because the private key is sealed.

Once a computation has been created and recorded on the ledger 808, an input provider 822 may bind himself/herself to that computation. For example, a computation may provide for data related to a user's spending on a monthly basis to be aggregated with other user's spending data by a number of data consumers. The user may decide that he or she approves of the use of this data so long as the data consumer receives only an aggregate total (i.e., with no granularity). In this example, the user may bind his/her input to that computation. At step 2 of process 800, the input provider 822 may contact the key manager enclave 802 to obtain a public key used to encrypt the input data to be used in the computation. The input for the input provider 822 may then be encrypted using the public key associated with the computation and stored in input data 814. Additionally, the key manager 802 may generate a separate key used to protect the computations state in all future function evaluations, which may be sealed and stored in persistent storage 810.

At step 3 of process 800, a policy checker enclave 804 may be invoked to check whether execution of a computation is compliant with that computation's policy. The policy checker retrieves the policy data for the computation from the ledger 808, the input data from input data 814, a previous state of the computation from state data 812, and any cryptographic keys needed to access the data from the key manager enclave 802. It should be noted that the cryptographic keys provided to the policy checker enclave 804 may be sealed, such that they are able to be accessed by the policy checker enclave 804 by virtue of a private key associated with the processor for the enclave. Since the system must scale to large data and since enclaves have limited physical memory, the encrypted inputs and state may be placed in non-enclave memory, and the accessed bits are authenticated, integrity-checked, and decrypted on-demand within the enclave's protected memory.

The policy checker enclave 804 may check whether execution of a computation is compliant with that computation's policy by checking two things. First, the computation must have been added to the ledger 808 and not revoked at any later time by any party. In creating the local copy, the policy checker enclave 804 may scan the ledger 808 for, and compile only, create and revoke entries related to the computation. The policy checker then asserts validity of the predicate:

$$\exists t_1.((\sigma,e)=L.\text{getContent}(t_1) \wedge \text{Verify}_L(\sigma,t_1 \| e)$$
$$\wedge e = \text{create} \| c) \wedge$$

$$\forall t_2. \neg (t_2 > t_1 \wedge (\sigma,e) = L.\text{getContent}(t_2) \wedge \text{Verify}_L(\sigma,t_2 \| e)$$
$$\wedge e = \text{revoke} \| c.\text{id})$$

In the above, a set of content is generated that represents the policies associated with the computation which have been created and not revoked with respect to some ledger height t.

Second, the conditions of the policy for the computation must be satisfied. In some embodiments, the policy checker 804 may create a local copy of the ledger 808. Provided that the policy checker enclave determines that execution of the computation is compliant with that computation's policy, the process 800 may involve proceeding to execute the computation.

$$[e | t^* \in \{0, \ldots, t\} \wedge t = L.\text{getCurrentCounter} \wedge (\sigma,e)$$
$$= L.\text{getContent}(t^*) \wedge \text{Verify}_L(\sigma,t^* \| e)$$
$$\wedge e = \text{compute} \| c.\text{id} \| \ldots ]$$

In the above, e is a last recorded element, (i.e., entry) of a list of ledger 808 entries for a computation. Additionally, t may be a height of the ledger 808 and a may be a signature. By way of example, consider a policy in which all transaction records in the input must be signed by the input provider 822, belong to the same month, and be fresh. An efficient method of enforcing freshness is to propagate a state of the computation (containing the timestamp of the latest transaction record), and then assert that all transaction records in the current ledger 808 input have a later timestamp, thus inductively implying freshness. To that end, one may write function f such that it records the highest timestamp amongst the input records as the computation's state, and implement the policy to inspect the last element (call this e) of the aforementioned list of ledger entries [e| . . . ]. To evaluate the policy, we ask the host of the policy checker enclave 804 to load e's state (which may produce a digest policy state recorded in e), and transfer control to the policy checker 804, which takes each transaction record in the current ledger 808 input and compares its timestamp with e's state. Alternatively, the policy checker 804 can also load the inputs from all prior computations (i.e., all of [e| . . . ]) and check membership of each ledger 808 record in the current input. It should be noted that this process would incur significantly more computation and storage overhead.

At step 4 of process 800, on approval from the policy checker enclave 804, a compute enclave 806 may be invoked to execute the computation. The compute enclave 806 may retrieve input data from input data 814, information for a function to be performed on the input data, data consumers (and public keys associated with those data consumers), a current height of the ledger 808 (when checked by the policy checker 804), and any other relevant information used in execution of the computation. The compute enclave 806 may then perform the function on the input data to generate output data. In some embodiments, the output data may be encrypted using one or more cryptographic keys (e.g., public keys associated with the data consumers) and stored in output data 816. In some embodiments, the output data may be encrypted using an encryption key for which a data consumer to which the data is to be provided does not have the corresponding decryption key.

In some embodiments, upon invocation, the compute enclave 806 may request information to be used in executing the computation. For example, the compute enclave 806 may request one or more keys from the policy checker enclave 804 as depicted in the following commands:

$$\varepsilon_f \rightarrow \varepsilon_\phi : \text{HW.Quote}(\varepsilon_f, c.\text{id} \| \text{epk})$$

$$\varepsilon_\phi \rightarrow \varepsilon_f : \text{HW.Quote}_{\varepsilon_\phi}, \text{PKE.Enc}(\text{epk}, t \| \delta_{in} \| \hat{k} \| k_s))$$

where $t \doteq L.\text{getCurrentCounter}$ used in $\varepsilon_\phi$ where $\hat{k} \doteq (k_i^1, S.\text{Sig}(sk_{p_i}^1, c.\text{id} \| k_i^1 \| c_1)) \| \ldots \| (k_i^m, S.\text{Sig}(sk_{p_i}^m, c.\text{id} \| k_i^m \| c_m))$ In the above, $\varepsilon_f$ represents the compute enclave 806 and $\varepsilon_\phi$ represents the policy checker enclave 804. In the above, k represents a cryptographic key. As shown, the compute enclave 806 may also receive a height t from the policy checker enclave 804, which represents a height of the ledger 808 at the time that the policy check was performed. The height t may be used by the compute enclave 806 to protect against a scenario in which a data consumer 818 provides a stale ledger 808 as well as to perform a serializability check as described below.

At step 5 of process 800, the compute enclave 806 may create a record of the executed computation on the ledger 808. This record may be used by future policy checker enclaves and/or compute enclaves in preforming the computation. For example, the policy checker enclaves and/or compute enclave may determine that because the computation has already been executed for a particular data consumer, a second execution of the computation would be a violation of the policy. In the embodiments in which the ledger 808 is a blockchain, such a ledger provides an immutable record, which is advantageous to such a system, as it also prevents tampering. In some embodiments, after executing the computation, but before writing a record of the computation to the ledger 808, the computation enclave 806 may perform a serializability check. A serializability check is performed to ensure that the computation is still active by checking all of the records occurring after a height h for execution of the computation, where h is a height of the ledger 808 at the time that the policy checker 804 checked the policy data (policy checker 804 may pass height h to the compute enclave 806). If the serializability check fails (i.e., the computation is determined to have been executed already), then the computation enclave 806 aborts the computation and may not write any record to the ledger 808.

$$\forall t, t', t^*, t' = L.\text{getCurrentCounter} \wedge t < t^* < t' \to \neg ((\sigma, e)$$
$$= L.\text{getContent}(t) \wedge \text{Verify}_L(\sigma, t^* \| e)$$
$$\wedge e = \text{compute} \| c.\text{id} \| \ldots \vee e = \text{revoke} \| c.\text{id}))$$

Here, the ledger L is checked to ensure that the computation c is still active and that no other function evaluation (with c.id) is performed in between height t and the current height t'. The computation is rejected if the check fails, and no entry is recorded on ledger L. An enclave (e.g., policy checker 804 and/or compute enclave 806) may be configured to reject a request (i.e., they refuse to compute) that does not satisfy the serializability check. Therefore, the ledger (more accurately, the ledger's participants) are expected to deny entries that do not satisfy serializability. However, they are not trusted to do so, as each enclave repeats the check internally.

In embodiments that utilize history-based policies, the system may need all computation steps to be logged, such that the compute enclave 806 must record the evaluation of function f on ledger 808 before it can reveal the output to any data consumer 818. For example, the compute enclave 806 may execute a "post" command in which:

$$L.\text{post}(\text{HW.Quote}(\varepsilon_f e))$$

where $e \doteq \text{compute} \| c.\text{id} \| t \| \delta_{inp} \| \delta_{out} \| \delta_{state} \| r$ Note in the above that e represents an entry to be written to the ledger 808 for computation c. As above, t represents a height of the ledger 808. Also included in the entry e may be input values, output values, a state, and an entropy source r (which may be a pseudo-random bitstream).

At step 6 of process 800, the system may implement techniques for distributing output data to a plurality of data consumers while ensuring fairness in that distribution of output data. These techniques are described in greater detail with respect to FIG. 9 below.

Figure 9:
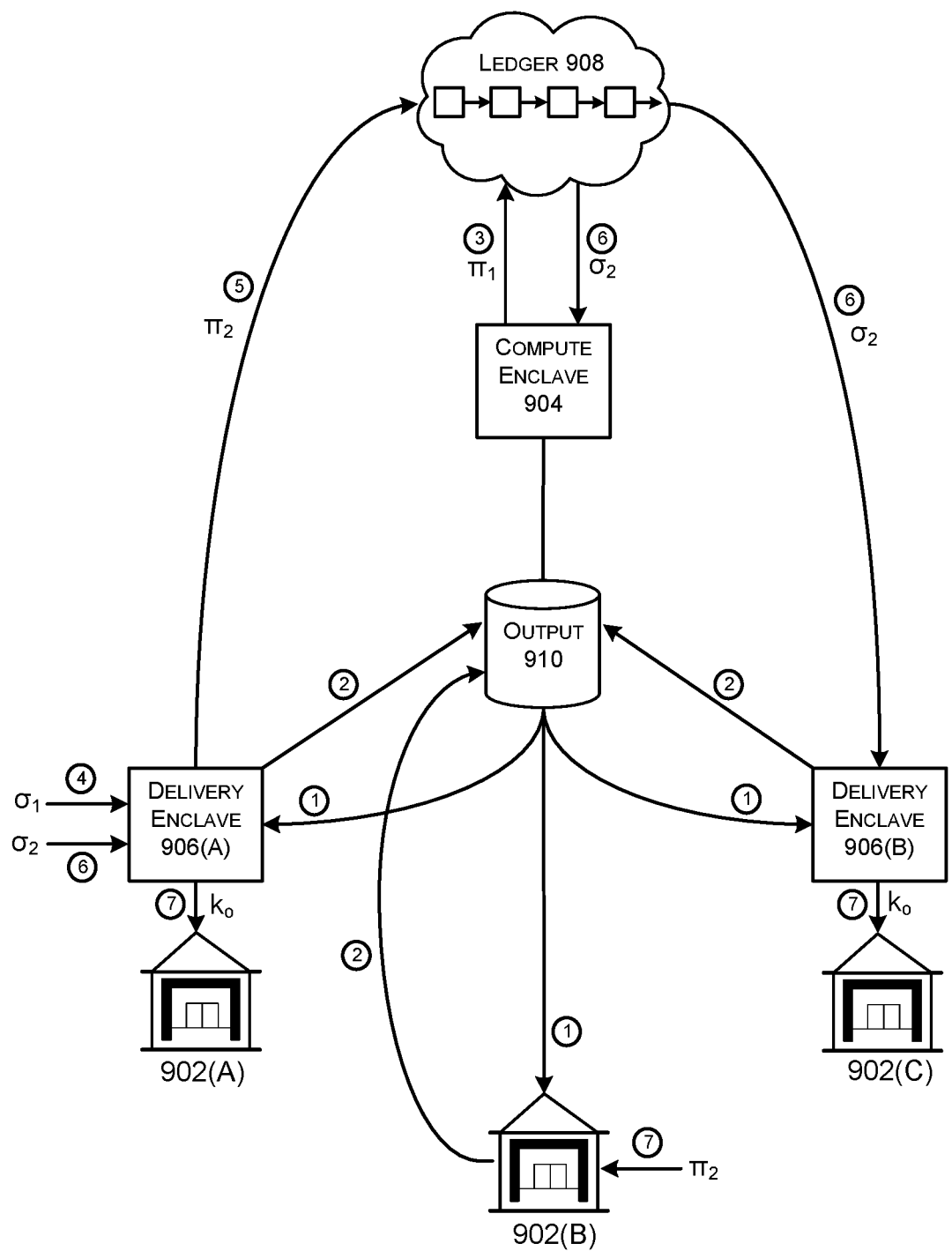
FIG. 9 depicts an illustrative example of techniques for distributing data to a plurality of data consumers while ensuring fairness in that distribution of data in accordance with at least some embodiments.

FIG. 9 depicts an illustrative example of techniques for distributing data to a plurality of data consumers while ensuring fairness in that distribution of data in accordance with at least some embodiments. While the illustrated example of FIG. 9 depicts data being distributed to three data consumers (902(A-C)), it should be noted that the system could be implemented to distribute data to any number n data consumers in the manners described. For the purposes of the example illustrated in FIG. 9, we assume that the data is being output by a compute enclave 904 hosted by one of the data consumers (902(B)), which is an untrusted party. In the example, each of the n-1 data consumers not hosting the compute enclave may implement a delivery enclave (906(A) and 906(C)) configured to perform at least a portion of the functionality described herein. Furthermore, each data consumer may have access to a public ledger 908, which is provides an immutable record of policies as well as data transactions conducted in relation to those policies. An example of a ledger 908 may be a blockchain, such as blockchain 210 described above. In some embodiments, output generated by the compute enclave 904 may be written to output data 910, which may be stored in memory of a host of the compute enclave 904 (e.g., a computer operated on behalf of data consumer 902(b)). Each of the data consumers 902 (A-C) may be granted access to retrieve data from output data 910.

Techniques for distributing data to a plurality of data consumers while ensuring fairness in that distribution of data will now be described by discussing interactions between the various components illustrated in FIG. 9. These techniques are described as process 900. It should be noted that process 900 may be performed within step 6 of process 800 described above in relation to FIG. 8.

Step 1 of process 900 may first involve encrypting the computed output to be distributed under a fresh random key $k_o$. This encrypted output is then provisioned onto each of the n-1 delivery enclaves 906 by the compute enclave 904, who store it internally.

$$\varepsilon_d \to \varepsilon_f : \text{HW.Quote}(\varepsilon_d, c \| \text{epk})$$

$$\varepsilon_f \to \varepsilon_d : \text{HW.Quote}(\varepsilon_f, c \| t \| \text{PKE.Enc}(\text{epk}, k_o))$$

The compute enclave 806 then delivers the encrypted output $\text{Enc}(k_o, \text{out})$ to each of the data consumers 902 (A-C). At step 2 of process 900, the compute enclave 904 collects a signed receipt a from each of those data consumers 902 (A-C).

$$\varepsilon_f \to \mathcal{P}_o^* : \text{HW.Quote}(\varepsilon_f, c \| t \| \delta_{out}) \| \text{AEAD.Enc}(k_o, \text{out})$$

$$\mathcal{P}_o^* \to \varepsilon_f : S.\text{Sig}(s^{k_{\mathcal{P}_o^*}}, c \| t \| \delta_{out})$$

At step 3 of process 900, the compute enclave 904 may generate an aggregate encoding of all n signatures and posts a record $\phi_1$ that includes that aggregate onto the ledger 908.

$$\mathcal{P}_c : L.\text{post}(\pi_1), \text{ which returns } (\rho_1, \_)$$

s.t. $\pi_1 \doteq S.\text{Sig}(s^{k_{\mathcal{P}_o^1}}, c \| t \| \delta_{out}) \| \ldots \| S.\text{Sig}(s^{k_{\mathcal{P}_o^n}}, c \| t \| \delta_{out})$ In some embodiments, the record posted to the ledger 908 may be combined with the on-ledger record of the computation that was executed.

Note that this may require that the compute enclave receive all of the signatures (i.e., signed receipts) at step 2 of process 900 before it can move on to step 3 of process 900. As would be recognized, a dishonest data consumer 902 may attempt to halt the process at this point by simply not providing a signed receipt. Accordingly, the system may, in some embodiments, include additional processes directed toward ensuring progress of the process 900, which are described in the sections below.

To ensure progress of the process 900, instead of performing a blocking receive in steps 2 and 3, the compute enclave may set a timeout, after which it aborts the process and starts over. It should be noted that an abort in step 2 or 3 does not compromise fairness as all recipients (data consumers 902) must progress beyond step 3 (and send signatures) in order for the output to be delivered to each of those recipients.

At step 4 of process 900, any of the data consumers 902 may, upon seeing record $\pi_1$ recorded on the ledger 908, advance the process 900 to the next stage. In some embodiments, this may involve the data consumer 902 providing a proof $\sigma_1$ (generated by ledger 908 upon posting record $\pi_1$ to it) to its respective delivery enclave 906. In response, the delivery enclave 906 may provide record $\pi_2$ to the data consumer 902, which contains an encryption of $k_o$ under data consumer 902(B)'s public key.

At step 5 of process 900, any of the data consumers 902 may post record $\pi_2$ on ledger 908. In response, the data consumer 902 may be provided with a proof $\sigma_2$ (generated by ledger 908 upon posting record $\pi_2$ to it).

$$\mathcal{P}_o : L.\text{post}(\pi_2),(\sigma_2,\_)$$

$$\text{s.t. } \pi_2 \doteq \text{PKE.Enc}(p^{kp_s^{\pi}}, k_o)$$

To ensure progress of the process 900 in steps 4 and 5, the following modifications may be made. First, note that each data consumer polls the ledger, by retrying the step on failure, until it finds the desired ledger entry (which is $\pi_L^1$ step 4 and $\pi_L^2$ step 5). Two modifications may be made to this naive scheme to ensure progress of process 900.

First, instead of scanning the entire ledger, one may place a bound on the number of entries the data consumer 902 must scan, and the message must then be posted within that bound lest the protocol be deemed aborted (by all data consumers). To that end, one may introduce a parameter $\Delta_1$, and stipulate that $\pi_L^1$ be posted on the ledger 808 within height $t+\Delta_1$ (where t is the height at which the policy check was evaluated). The compute enclave 904 may then check $t_L^1$ and $\sigma_L^1$ to validate this requirement. Similarly, one may stipulate that $\pi_L^1$ be posted within $\Delta_2$ entries from $\pi_L^1$ (i.e., within height $t_L^1+\Delta_2$).

Second, we let the data consumers 902 advance the ledger to prevent waiting forever (though, in practice, we may find that concurrent, unrelated computations may advance the ledger on their own). The system lets a data consumer 902 produce dummy entries on the ledger, whose only purpose is to advance the ledger. To prevent this mechanism to act as a vehicle for a denial-of-service attack on the other output recipients, one may impose a requirement that sufficient time must have elapsed (using a trusted clock source) since the last ledger entry (or at least the last ledger entry made by a particular data consumer 902). In this way, the dummy entries may act as clock ticks. Furthermore, to prevent other computations (that post frequently to the ledger) from causing the computation to abort, one may define $\Delta_1$ and $\Delta_2$ in terms of clock ticks, where each tick must demonstrate that a clock period has elapsed since the previous tick. Note that the clock service is not trusted for fairness or correctness, but is only used to reliably advance the protocol.

Each delivery enclave 906 may then receive proof from its respective data consumer at step 6 of process 900. In response, the delivery enclave 906 may provide the key $k_o$ to its respective data consumer 902 at step 7 of process 900 upon receiving proof $\sigma_2$. It should be noted that data consumer 902(B), being the host of the compute enclave 904, may simply obtain record $\pi_2$ from the ledger 908, as record $\pi_2$ includes an encryption of $k_o$ under data consumer 902(B)'s public key. Hence, data consumer 902(B)'s private key can be used to obtain $k_o$. Each data consumer 902 may then decrypt the encrypted output using key $k_o$.

Embodiments of the disclosure provide for a number of technical advantages over conventional systems. For example, embodiments of the disclosure enable a user to dictate how his or her information is distributed and used in a secure manner. The use of a blockchain in the manners described provides the user with the ability to manage information usage policies in a secure, immutable, and verifiable manner. This, in turn, enables trusted transactions to be performed in a distributed environment that includes entities that are not necessarily trusted. Additionally, embodiments of the system are able to maintain a record of how that user's data is actually being used, providing greater transparency to the user.

Furthermore, while embodiments of the described system enable efficient computing on sensitive data, they do not require that computing to be performed locally. In fact, the system enables computations to be performed on sensitive data even by untrusted entities. The use of private enclaves in the manner described to perform various processing enables an untrusted entity to work with sensitive data without actually gaining access to that sensitive data.

Additionally, the system described herein is configured to provide simultaneous release of the sensitive data to different data consumers. This prevents collusion between one or more data consumers and a host computer on which the data is computed. Collusion can be harmful to consumers when data is not distributed simultaneously. For example, in the scenario in which data consumers are competitors for the consumer's business, if a data consumer receives user data before other data consumers (or if the other data consumers do not receive the user data at all), then the consumer may be forced to accept an offer from that data consumer, even when that offer is not in the best interests of the consumer. The described system prevents this by ensuring that all consumers of the user's data receive that data simultaneously or not at all.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving distribution instructions for output data relating to a user of a client device, the distribution instructions comprising an indication of a plurality of data consumers;
encrypting the output data using a first cryptographic key;
providing access to the encrypted output data to each of the plurality of data consumers;
receiving, from each of the plurality of data consumers, an indication that the access to the encrypted output data was received by that data consumer; and
posting, a record comprising a plurality of indications that are respectively received from the plurality of data consumers and indicate that an access to the encrypted output data was received by the plurality of data consumers to a blockchain ledger respectively,
wherein, upon confirming with the blockchain ledger that the indication that each of the plurality of data consumers has been provided access to the encrypted output data, a second cryptographic key is provided to a plurality of private enclaves associated with computing devices operated by the plurality of data consumers, the second cryptographic key configured to be used by the data consumers to decrypt the encrypted output data.

2. The method of claim 1, wherein the plurality of private enclaves includes a compute enclave and a delivery enclave, the compute enclave delivering the encrypted output data to the delivery enclave.

3. The method of claim 1, wherein the indication that the access to the encrypted output data was received by a data consumer comprises a signed delivery receipt from that data consumer.

4. The method of claim 3, wherein the signed delivery receipt is signed using a private key of the data consumer.

5. The method of claim 1, wherein the output data, after being encrypted using the first cryptographic key, is further encrypted using a plurality of third cryptographic keys.

6. The method of claim 5, wherein the plurality of third cryptographic keys comprises public keys associated with each of the plurality of data consumers, wherein each of the plurality of data consumers is provided access to the encrypted output data that is further encrypted using a respective public key of each of the plurality of data consumers.

7. The method of claim 1, wherein the first cryptographic key and the second cryptographic key are the same cryptographic key, wherein the plurality of private enclaves are embedded in the computing devices.

8. The method of claim 1, wherein the first cryptographic key is an encryption key and the second cryptographic key is a decryption key corresponding to, and different from, the encryption key.

9. The method of claim 1, wherein the second cryptographic key is not provided to any of the plurality of data consumers when the indication that the access to the encrypted output data was received is not received from all of the plurality of data consumers within a timeout window.

10. The method of claim 1, further comprising:
confirming that each of the plurality of data consumers has not already been provided access to the encrypted output data; and
writing an entry to the blockchain ledger indicating that the plurality of data consumers has been provided access to the encrypted output data.

11. A computing system comprising:
a processor; and
a memory including instructions that, when executed by the processor, cause the computing system to, at least:
receive distribution instructions for output data relating to a user of a client device, the distribution instructions comprising an indication of a plurality of data consumers;
encrypt the output data using a first cryptographic key;
provide access to the encrypted output data to each of the plurality of data consumers;
receive, from each of the plurality of data consumers, an indication that the access to the encrypted output data was received by that data consumer; and
post a record comprising a plurality of indications that are respectively received from the plurality of data consumers and indicate that an access to the encrypted output data was received by the plurality of data consumers to a blockchain ledger respectively;
wherein, upon confirming with the blockchain ledger that the indication that each of the plurality of data consumers has been provided access to the encrypted output data, a second cryptographic key is provided to a plurality of private enclaves associated with computing devices operated by the plurality of data consumers, the second cryptographic key configured to be used by the data consumers to decrypt the encrypted output data.

12. The computing system of claim 11, wherein the memory comprises an isolated region of memory protected by a trusted execution environment platform which is separate from other memory of the computing system.

13. The computing system of claim 12, wherein the output data is not available to other applications running on the computing system outside the memory.

14. The computing system of claim 11, wherein the computing system is operated by a server.

15. The computing system of claim 11, wherein the plurality of data consumers are determined based on a specification for a computation used to generate the output data, the specification being retrieved from a public ledger.

16. The computing system of claim 11, wherein the encrypted output data is transmitted to each of the plurality of data consumers.

17. The computing system of claim 11, wherein the encrypted output data is written to a memory location at which each of the plurality of data consumers is able to access the encrypted output data.

18. The computing system of claim 11, wherein the instructions further cause the computing system to generate an aggregate encoding of the plurality of indications that the access to the encrypted output data was received.

19. The computing system of claim 11, wherein the plurality of data consumers are untrusted entities.

20. The computing system of claim 11, wherein the first cryptographic key is encrypted using a third cryptographic key associated with the processor and stored outside of the memory.

* * * * *